United States Patent
Yushin et al.

(10) Patent No.: US 12,113,164 B2
(45) Date of Patent: Oct. 8, 2024

(54) ELECTROLYTE OR ELECTRODE ADDITIVES FOR INCREASING METAL CONTENT IN METAL-ION BATTERIES

(71) Applicant: Sila Nanotechnologies, Inc., Alameda, CA (US)

(72) Inventors: Gleb Yushin, Atlanta, GA (US); Bogdan Zdyrko, Atlanta, GA (US); Alexander Thomas Jacobs, Oakland, CA (US); Eugene Michael Berdichevsky, Alameda, CA (US)

(73) Assignee: SILA NANOTECHNOLOGIES, INC., Alameda, CA (US)

( * ) Notice: Subject to any disclaimer, the term of this patent is extended or adjusted under 35 U.S.C. 154(b) by 0 days.

(21) Appl. No.: 18/315,245

(22) Filed: May 10, 2023

(65) Prior Publication Data

US 2023/0282874 A1 Sep. 7, 2023

Related U.S. Application Data

(63) Continuation of application No. 14/464,873, filed on Aug. 21, 2014, now Pat. No. 11,721,831.

(60) Provisional application No. 61/902,167, filed on Nov. 9, 2013, provisional application No. 61/872,509, filed on Aug. 30, 2013.

(51) Int. Cl.
| | |
|---|---|
| H01M 10/0525 | (2010.01) |
| H01M 10/054 | (2010.01) |
| H01M 10/42 | (2006.01) |
| H01M 10/44 | (2006.01) |
| H01M 50/691 | (2021.01) |

(52) U.S. Cl.
CPC ..... *H01M 10/0525* (2013.01); *H01M 10/054* (2013.01); *H01M 10/4235* (2013.01); *H01M 10/446* (2013.01); *H01M 50/691* (2021.01); *Y02T 10/70* (2013.01); *Y10T 29/49108* (2015.01)

(58) Field of Classification Search
CPC ......... H01M 10/0567; H01M 10/0568; H01M 10/0569
See application file for complete search history.

(56) References Cited

U.S. PATENT DOCUMENTS

| | | | |
|---|---|---|---|
| 6,551,746 B1 * | 4/2003 | Vitins ................... | H01M 4/485 429/231.1 |
| 2012/0021284 A1 * | 1/2012 | Lee ....................... | H01M 4/366 429/223 |

(Continued)

OTHER PUBLICATIONS

Jung et. al; "Fluoropropanesultone as an SEI-forming additive that outperforms vinylene carbonate" (Year: 2013).*

*Primary Examiner* — Nathanael T Zemui
(74) *Attorney, Agent, or Firm* — MUNCY, GEISSLER, OLDS & LOWE, P.C.; Daniel Podhajny

(57) ABSTRACT

Metal-ion battery cells are provided that take advantage of the disclosed "doping" process. The cells may be fabricated from anode and cathode electrodes, a separator, and an electrolyte. A metal-ion additive may be incorporated into (i) one or more of the electrodes, (ii) the separator, or (iii) the electrolyte. The metal-ion additive provides additional donor ions corresponding to the metal ions stored and released by anode and cathode active material particles. An activation potential may then be applied to the anode and cathode electrodes to release the additional donor ions into the battery cell.

31 Claims, 13 Drawing Sheets

(56) References Cited

U.S. PATENT DOCUMENTS

| | | | | |
|---|---|---|---|---|
| 2012/0135318 A1* | 5/2012 | Kim | ............... | H01M 4/525 |
| | | | | 429/231.95 |
| 2012/0164533 A1* | 6/2012 | Senoue | ............. | H01M 4/525 |
| | | | | 429/219 |
| 2012/0196181 A1* | 8/2012 | Ishida | ............... | H01M 4/485 |
| | | | | 429/211 |
| 2014/0212755 A1* | 7/2014 | Wu | ............... | H01M 4/131 |
| | | | | 429/231.9 |
| 2014/0255796 A1* | 9/2014 | Matsuoka | ......... | H01M 4/139 |
| | | | | 429/188 |

\* cited by examiner

ELECTROLYTE OR ELECTRODE ADDITIVES FOR INCREASING METAL CONTENT IN METAL-ION BATTERIES

CROSS-REFERENCE TO RELATED APPLICATIONS

The present Application for Patent is a Continuation of U.S. patent application Ser. No. 14/464,873, entitled "ELECTROLYTE OR ELECTRODE ADDITIVES FOR INCREASING METAL CONTENT IN METAL-ION BATTERIES," filed Aug. 21, 2014, which in turn claims the benefit of U.S. Provisional Application No. 61/872,509, entitled "SACRIFICIAL SALT ADDITIVES TO ELECTROLYTES FOR INCREASING METAL CONTENT IN METAL-ION BATTERIES," filed Aug. 30, 2013, and U.S. Provisional Application No. 61/902,167, entitled "HIGH CAPACITY ADDITIVES TO ELECTRODES FOR COMPENSATING FIRST CYCLE LOSSES IN METAL-ION BATTERIES," filed Nov. 9, 2013, each of which is assigned to the assignee hereof, and each of which is expressly incorporated herein by reference in its entirety.

BACKGROUND

Field

The present disclosure relates generally to energy storage devices, and more particularly to metal and metal-ion battery technology and the like.

Background

Owing in part to their relatively high energy densities, light weight, and potential for long lifetimes, advanced metal-ion batteries such as lithium-ion (Li-ion) batteries are desirable for a wide range of consumer electronics. In many applications, Li-ion batteries have essentially replaced nickel-cadmium and nickel-metal-hydride batteries. Despite their increasing commercial prevalence, however, further development of metal-ion batteries is needed, particularly for potential applications in low- or zero-emission hybrid-electrical or fully-electrical vehicles, consumer electronics, energy-efficient cargo ships and locomotives, aerospace, and power grids. Such applications will require electrodes with higher specific capacities than those used in currently-existing Li-ion batteries.

One barrier to higher specific capacity metal-ion batteries is an insufficient content of metal ions available for reversible electrochemical reactions between corresponding anodes and cathodes. In the case of Li-ion batteries, some of the lithium may be lost, for example, during the formation of a solid electrolyte interphase (SEI) that takes place during the first cycle. The addition of stabilized lithium powder onto the electrode surface may be used to compensate (to some extent) for the loss of lithium during the SEI formation or for an insufficient supply of lithium from the cathode. However, the use of lithium metal requires the use of dry rooms, which makes the battery fabrication process more expensive. In addition, utilization of lithium powder may introduce significant safety hazards. Other metal-ion batteries, such as Na-ion, Mg-ion, Al-ion, and others often suffer from similar limitations.

Accordingly, despite the advancements made in synthesizing electrode materials, metal-ion batteries often require additional sources of metal ions to complement those stored in the electrodes. As a result, there remains a need for improvements to battery construction, composition, and related manufacturing processes to address this issue.

SUMMARY

Embodiments disclosed herein address the above stated needs by providing "donor" metal ions (such as Li ions) for metal ion batteries from metal-ion (such as Li-ion) comprising additives. Such additives may be incorporated into the electrolyte, the electrodes, or even the separator.

A metal-ion battery cell taking advantage of this doping process may be fabricated from anode and cathode electrodes, a separator, and an electrolyte. A metal-ion additive may be incorporated into (i) one or more of the electrodes, (ii) the separator, or (iii) the electrolyte. The metal-ion additive provides additional donor ions corresponding to the metal ions stored and released by anode and cathode active material particles. An activation potential may then be applied to the anode and cathode electrodes to release the additional donor ions into the battery cell.

In some designs, Li-ion-comprising additives, for example, may include Li-containing "sacrificial" salts. Such salts may be added into the cell (e.g., added into one of the electrodes, the electrolyte, or the separator membrane). During application of a potential between the one of the battery electrodes (e.g., the anode) and a counter electrode (e.g., the cathode) the decomposition of such sacrificial salts results in the release of Li to be incorporated into the electrode (e.g., the anode). Gaseous products that are not harmful for the battery components (such as the electrodes, electrolyte, and current collectors) may be evacuated from the battery during or after this decomposition process. The amount of sacrificial salt additives can be determined, for example, based on the amount of Li needed (e.g., to form a solid electrolyte interphase (SEI) layer on the anode) and the specific capacity of the high capacity additive material.

In some designs, either the electrolyte or electrolyte solvent or electrolyte solvent mixtures utilized during the above process of sacrificial Li salt decomposition and incorporating of at least some of the Li ions into one of the electrodes (e.g., an anode) may be replaced with another electrolyte or electrolyte solvent or electrolyte solvent mixtures prior to battery use to achieve more favorable performance in a given application.

In some designs, the Li-ion-comprising additives may comprise a high (metal-ion) capacity material. This material comprising high Li content may be added to the cathode to provide Li ions to the cell (e.g., to compensate for first cycle losses). The added material may preferably have at least a 10% higher volumetric capacity than the active cathode material used for battery construction. However, this material does not necessarily need to provide long cycle life or particularly high energy density. The main requirements for such a material are high capacity, stability during the Li ion donation process, and the absence of undesirable processes that would reduce battery cell performance during regular operation. It is further desirable for this high capacity additive material to be stable in dry air. By providing such an additive, the total useful energy density of the cell after the formation cycle is increased. The amount of additives can again be determined based on the amount of Li needed (e.g., to form an SEI layer on the anode) and the specific capacity of the high capacity additive material.

In some designs, either the electrolyte or electrolyte solvent or electrolyte solvent mixtures utilized during the above process of Li donation from the high capacity additive cathode material and incorporating of at least some of the Li ions into one of the electrodes (e.g., an anode) may be replaced with another electrolyte or electrolyte solvent or electrolyte solvent mixtures prior to battery use to achieve more favorable performance in a given application.

In some designs, either individual electrode (anode, cathode, or both) active particles or the whole electrode (anode, cathode, or both) may be coated with a suitable thin metal layer in order to either enhance the properties of the SEI produced on one of the electrodes (e.g., an anode), to prevent the dissolution of active material components during battery cycling, or to prevent undesirable interactions between the active material(s) and either electrolyte, electrolyte decomposition products, or decomposition products of high capacity additives (such as "sacrificial salts" or other high capacity materials).

Methods of fabricating a higher energy density battery are also provided. The method may comprise, for example: providing active material particles to store and release ions during battery operation; electrically connecting the anode active particles with the anode current collector; electrically connecting the cathode active particles with the cathode current collector (for connecting the active particle together during the electrode fabrication, this method may involve mixing the active particles with a binder); assembling the cell comprising the produced anode and cathode; filling the assembled cell with an electrolyte comprising sacrificial (e.g., Li ion) salts; applying a potential to the electrodes in order to induce decomposition of the sacrificial salts and release of Li ions to one of the electrodes (e.g., anode); and evacuating the gaseous products from the cell prior to sealing the cell. In some designs, prior to sealing, this method may involve at least partial replacement of the electrolyte used for the "Li doping" of the anode with another electrolyte that provides more favorable performance in certain applications of the produced high energy density Li ion battery. The replaced electrolyte may, for example, either form a more favorable SEI on the anode during the "Li doping" or be less expensive, but suffer from poor performance (e.g., low ionic conductivity or poor stability on the cathode) during regular cell operation.

Other such methods may also comprise, for example: providing active material particles to store and release ions during battery operation; providing a high capacity active material additive to release Li ions during a "Li doping procedure"; electrically connecting the anode active particles with the anode current collector; electrically connecting the cathode active particles with the cathode current collector, where at least one of the electrodes (e.g., the cathode) additionally incorporates and electrically connects the above high capacity active material additive within the electrode; assembling the cell comprising the produced anode and cathode; filling the assembled cell with an electrolyte; applying a potential to the electrodes in order to extract Li from the high capacity material additive and utilize the extracted Li ions to "Li dope" the anode; and evacuating the gaseous products from the cell (if formed) prior to sealing the cell. In some designs, prior to sealing, this method may involve at least partial replacement of the electrolyte used during the "Li doping" of the anode with another electrolyte that provides more favorable performance in certain applications of the produced high energy density Li ion battery.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

In relation to the background above, improvements are provided in the performance and properties of various rechargeable metal and metal-ion (such as Li and Li-ion) cells or electrodes, including those that are produced without providing additional metal ions from the disclosed metal-ion comprising additives. Such improvements include, but are not limited to, better cycle stability, better rate performance, and better capacity retention during storage at elevated temperatures, to name a few. In many cases, these improvements may be provided by improved properties of various coatings on the surface of electrodes (such as solid electrolyte interphase (SEI) layer coatings or other surface coatings).

While the description below may describe certain examples in the context of Li and Li-ion batteries (for brevity and convenience, and because of the current popularity of Li technology), it will be appreciated that various aspects may be applicable to other rechargeable and primary, metal and metal-ion batteries.

Figure 1:
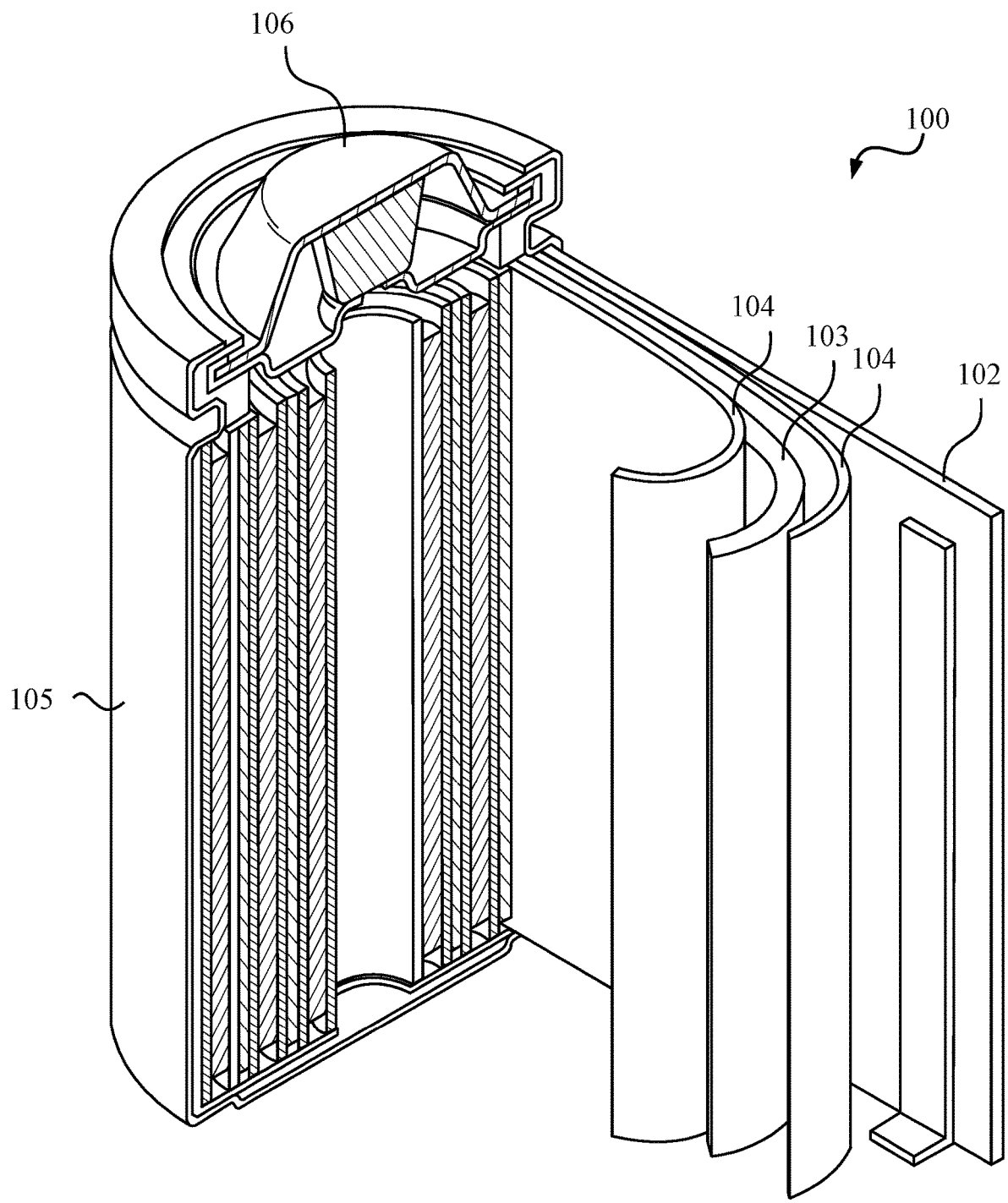
FIG. 1 illustrates an example metal-ion (e.g., Li-ion) battery in which the components, materials, methods, and other techniques described herein, or combinations thereof, may be applied according to various embodiments.

FIG. 1 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (not shown) impregnating the separator 104, a battery case 105, and a sealing member 106 sealing the battery case 105.

Conventional electrolytes for Li- or Na-based batteries of this type are generally composed of a single Li or Na salt (such as $LiPF_6$ for Li-ion batteries and $NaPF_6$ or $NaClO_4$ salts for Na-ion batteries) in a mixture of solvents (such as a mixture of carbonates). The most common salt used in a Li-ion battery electrolyte, for example, is $LiPF_6$, while less common salts include lithium tetrafluoroborate ($LiBF_4$), lithium perchlorate ($LiClO_4$), and lithium imides (such as $FSO_2N^-(Li^+)SO_2F$, $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$, and others).

The present disclosure provides a new process where Li ions, for example, can be supplied to Li-ion batteries by the decomposition of "less stable" or "unstable" Li-containing "sacrificial" salts (additives) added into the battery (e.g., added into one of the electrodes, the electrolyte, or the separator membrane) during charging of the battery, and where the decomposition process results in the formation of Li to be incorporated into the electrode (which may be referred to herein as "Li doping" of the electrode) and gaseous products that are generally not harmful to the battery components (including electrodes, electrolyte, and current collectors). Such gaseous decomposition products can be removed from the battery during or after the first (so-called "formation") cycle.

Conditions of the decomposition of these "sacrificial" salt additives may be selected in such a way as to minimize or avoid any harmful effect on the cell. In some designs, the primary salt (e.g., $LiPF_6$) used in the Li-ion battery may be present in the electrolyte during the Li doping process and, in this case, protected against decomposition during the decomposition of the sacrificial salts.

In some designs, it may be advantageous to incorporate the salt additives into protective shells, which may decompose or dissolve over time or under the application of an external stimulus (e.g., temperature). In this way, the salts can be released into the battery after some electrochemical reactions (e.g., after the SEI formation).

In some designs, it may be advantageous to incorporate primary salts (e.g., $LiPF_6$) into protective shells, which may decompose or dissolve over time or under the application of an external stimulus (e.g., elevated temperature or high electric potential). In this way, the primary salts can be preserved after the "sacrificial" salts are decomposed.

As examples, the following "sacrificial" Li salts (in their anhydrous forms) have been found to work well for supplying Li into Li-ion battery electrodes upon their decomposition: (1) lithium nitrate $LiNO_3$, (2) lithium nitrite $LiNO_2$, (3) lithium sulfite $Li_2SO_3$, (4) lithium nitride $Li_3N$, (5) lithium oxide ($Li_2O$), (6) lithium selenite $Li_2SeO_3$, (7) lithium carbonate $Li_2CO_3$, (8) lithium acetate $CH_3COOLi$, (9) lithium halides (e.g., Li chloride LiCl, Li iodide LiI, lithium fluoride LiF, etc.), (10) Li salts of organic acids RCOOLi, where R is an alkyl, alkene, or alkyne radical containing from 1 to 5 carbon atoms, (11) Li salts of organic acids bearing more than one carboxylic group such as oxalic acid $(COOLi)_2$, citric acid $LiOOCCH_2CH(OH)CH_2COOLi$, fumaric acid $LiOOCCH=CHCOOLi$, hexacarboxylcyclohexane $(CHCOOLi)_6$ and the like, and (12) Li salts of carboxyl multisubstituted benzene ring (examples include, but are not limited to, trimellitic acid $C_6H_3(COOLi)_3$, 1,2,4,5-benzenetetracarboxylic acid (pyromellitic acid) $C_6H_2(COOLi)_4$, and mellitic acid $C_6(COOLi)_6$).

Similar "sacrificial" salts with other metal ions may work to supply additional metal ions for other types of metal-ion batteries. Examples include, but are not limited to, (1) sodium nitrate $NaNO_3$, (2) sodium nitrite $NaNO_2$, (3) sodium sulfite $Na_2SO_3$, (4) sodium nitride $Na_3N$, (5) sodium oxide ($Na_2O$), (6) sodium selenite $Na_2SeO_3$, (7) sodium carbonate $Li_2CO_3$, (8) sodium acetate $CH_3COONa$, (9) NaCl, (10) Na salts of organic acids RCOONa, where R is an alkyl, alkene, or alkyne radical containing from 1 to 5 carbon atoms, (11) Na salts of organic acids bearing more than one carboxylic group such as oxalic acid $(COONa)_2$, citric acid $NaOOCCH_2CH(OH)CH_2COONa$, fumaric acid $NaOOCCH=CHCOONa$, hexacarboxylcyclohexane $(CHCOONa)_6$ and the like, and (12) Na salts of multisubstituted benzene ring, where trimellitic acid $C_6H_3(COONa)_3$, 1,2,4,5-benzenetetracarboxylic acid $C_6H_2(COONa)_4$, and mellitic acid $C_6(COONa)_6$ can be utilized to supply additional Na to Na-ion batteries during decomposition of the sacrificial salts.

In some designs, it may be advantageous for the sacrificial salts to be added directly to the electrolyte prior to filling the cell with the electrolyte. In this case, the cell fabrication procedure is generally the simplest. In other designs, however, it may be advantageous to add the sacrificial salts to one of the electrodes (or to both electrodes). In this case, a higher content of the sacrificial salts may be incorporated and thus a higher amount of Li can be provided. The pores formed within the electrode after the salt dissolution and/or decomposition may provide channels for faster transport of Li ions. In some designs, it may even be advantageous to incorporate the sacrificial Li salts into the separator.

In some designs, the product(s) of the sacrificial salt decomposition (or a fraction of the sacrificial salts) may stay within the cell and become incorporated within the electrodes. In some cases, such decomposition products may improve cell performance by, for example, improving the properties of the SEI formed on the anode or improving the properties of the coating formed on the surface of the cathode.

Examples of Li salts that may work well for this application include, but are not limited to, Li salts of selected organic acids. Depending of the nature of the particular acid, $CO_2$ or CO and/or hydrocarbons (gaseous at ambient conditions) may be side products of the decomposition during Li extraction. The following salts have been found to function well: (1) Li acetate $CH_3COOLi$, (2) Li malonate $C_3H_2O_4Li_2$, (3) Li citrate $C_6H_5O_7Li_3$, (4) Li methanetetracarboxylate $C(COO)_4Li_4$, (5) Li salts of organic acids bearing more than one carboxylic group such as oxalic acid $(COOLi)_2$, (6) citric acid $LiOOCCH_2CH(OH)CH_2COOLi$, (7) fumaric acid $LiOOCCH=CHCOOLi$, (8) hexacarboxylcyclohexane $(CHCOOLi)_6$ and the like, and (9) Li salts of carboxyl multisubstituted benzene ring (such as trimellitic acid $C_6H_3(COOLi)_3$, 1,2,4,5-benzenetetracarboxylic acid (pyromellitic acid) $C_6H_2(COOLi)_4$, and mellitic acid $C_6(COOLi)_6$).

Li salts of polymeric carboxylic acids may also serve as high Li capacity additives for "Li doping". Examples of such Li salts include, but are not limited to, polymers formed from acrylic, methacrylic, maleic, or fumaric acids, and their copolymers. Copolymers of the above-mentioned acids with other monomers can be utilized as well. Poly(maleic acid-co-butadiene) is an example of such a copolymer. During oxidation and Li extraction from such Li-rich salts, gaseous $CO_2$ will be released, while the polymer chain will transform into polyhydrocarbons, which will stay within the electrode. The advantage of this approach is that polymers are easy to disperse uniformly within the electrode (e.g., by dissolving in a solvent during electrode casting).

In some designs, the Li salt additives used for Li doping may serve multiple functions.

As discussed above, addition of some such salts may improve the properties of the SEI formed on the anode. For example, the decomposition products of lithium carbonate Li$_2$CO$_3$ may improve the SEI. Li salts of selected organic acids may also improve the SEI properties. Similarly, the Li salts of oligomeric carboxylic acids as well as the above-discussed organic acids improve the anode SEI properties during their decomposition. Therefore, their use may be advantageous in some applications.

In some designs, other functionalities may also be preferred. For example, Li-rich polyelectrolyte salts may serve as a cathode binder in addition to providing Li during their electrochemical decomposition.

In some designs, it has been found that coating cathode particles with a thin layer of Li-ion permeable metal or semimetal is advantageous when sacrificial Li salts are used. The following metals and semimetals have been found to be suitable: aluminum (Al), magnesium (Mg), silicon (Si), tin (Sn), indium (In), and gallium (Ga). A combination of such metals may also be advantageous in some applications. Without being bound to a particular theory, it is believed that the presence of such metal or semi-metal coatings on the surface of the cathode induces formation of some sort of protective layer that prevents cathode degradation (e.g., by dissolution of some of the transition metals from the cathode surface) or forms a better passivating coating on such cathodes (e.g., improves charge transfer resistance). Furthermore, such metals and semimetal coatings may reduce the catalytic effect of some of cathodes (such as cathodes comprising Fe, Mn, Co, or Ni) towards solvent oxidation and thus increase the oxidation potential of electrolyte solvents.

In some designs, the above-discussed coatings on at least a portion of cathode particles or cathodes may provide benefits including enhanced cell performance for regular cells, where high capacity additives (such as sacrificial salt additives and other high capacity additives, as described above and below) are not used. As discussed above, without being bound to a particular theory, the presence of such metal or semi-metal coatings on the surface of the cathode are believed to (i) induce formation of some sort of protective layer that prevents cathode degradation, (ii) form a better passivating coating on such cathodes, and (iii) reduce the catalytic effect of some of the cathodes (such as cathodes comprising Fe, Mn, Co, or Ni) towards solvent oxidation and thus increase the oxidation potential of electrolyte solvents.

In some designs, it has been found that coating high voltage (e.g., operating above 0.5 V vs. Li/Li+ and below 2.5 V vs. Li/Li+ during cell charging and discharging) anode particles with a thin layer of Li-ion permeable metal or semimetal is advantageous for improving the anode stability and overall performance characteristics (such as electrolyte and cell stability at elevated temperatures, better coulombic efficiency, etc.). Examples of such anode materials include lithium titanate (LTO) and phosphorous. The following metals and semimetals have been found to be suitable: aluminum (Al), magnesium (Mg), silicon (Si), tin (Sn), copper (Cu), and indium (In). Such improvements may be achieved either when high capacity Li additives are used or when such additives are not used.

The suitable thickness of the above metal coatings depends on the particle size, metal ion diffusion rates, and the specific operating conditions (e.g., temperature of cell operation). Most commonly, however, metal layer thickness from approximately 1 nm to approximately 50 nm have been found to be most suitable for metal-ion battery applications.

In some designs, deposition of the above metal coatings on the surface of at least one of the electrodes (or electrode active particles) may be used in order to further deposit (or to further form) a uniform and well adhered thin layer of suitable metal oxides, metal fluorides, or metal oxyfluorides, which may similarly improve cell performance. Oxides, fluorides, or oxyfluorides of aluminum, silicon, tin, indium, gallium, and lanthanum are examples of suitable coatings. A thickness of such coatings in the range of approximately 1 nm to approximately 50 nm has been found to be particularly suitable for metal-ion battery applications.

In some designs (e.g., when an FSO$_2$N$^-$(Li$^+$)SO$_2$F salt is used in the electrolyte, when faster Li doping is needed, when sacrificial salt decomposition is too slow at room temperature, when a better SEI forms at elevated temperatures, or when high content of the desirable components should ideally be dissolved in the electrolyte), conducting the first one or few charge-discharge cycles at elevated temperatures (e.g., between around 30° C. and around 70° C.) may be advantageous for achieving the most favorable cell performance. This may be due to the favorable properties of the protective coatings formed at such elevated temperatures. In some applications when sacrificial salt decomposition is too fast at room temperature, conducting Li doping at lower temperatures (e.g., below 20° C.) may also be advantageous.

Turning to other types of high capacity additives, in most cases, cathode materials utilized in rechargeable metal or metal-ion batteries (such as Li-ion batteries) are selected to provide the highest volumetric energy density of the battery in combination with a sufficiently long (for a given application) cycle life and sufficiently high (for a given application) rate performance. To achieve the high energy density, cathode materials are often selected to maximize the combination of high cell voltage and high volumetric capacity. As mentioned previously, some of the metal-ion content from such cathode materials is lost, mostly during the formation of the SEI on the anode. High specific surface area anodes, in particular, require a significant amount of metal ions for SEI formation. This consumption contributes to the irreversible capacity losses during the formation cycles (commonly the first cycle or the first few cycles) of battery operation. Since these metal ions are consumed irreversibly, the process reduces the amount of active metal ions remaining in the cathode, thus lowering the overall capacity and energy density of the cell. In Li-ion batteries with graphite anodes, these first cycle losses for the SEI formation typically contribute to a loss of 4%-15% of total cell capacity. In some of the high-rate cells containing smaller size graphite particles, the first cycle losses may reach 15%-20% of total cell capacity. In the case of nanostructured high surface area anodes containing Si, Sn, or other elements that electrochemically alloy with Li, the formation cycle losses may be as high as 15%-45%. In the case of nanostructured oxides (such as SiO$_x$), the formation cycle losses may be even higher than 45%.

According to various embodiments herein, a high (metal-ion) capacity material may be added to the cathode to provide metal ions to compensate for these first cycle losses. Ideally, the added material may have a 10% higher (or more) volumetric capacity than the active cathode material used for battery construction. However, it may not necessarily need to provide a long cycle life (or any reversibility since its main function is to serve as a source of metal ions only once, during the first cycle formation), a high rate, or a sufficiently high voltage. Because quite often materials having relatively low Li extraction (or Li insertion) potential (and thus offering relatively low energy density) have noticeably higher volumetric capacity than the high-voltage cathode material used in battery construction (while being substantially more stable against chemical oxidation in air than Li metal), in some embodiments it may be advantageous to use them only as "high capacity cathode additives" to provide Li to form the SEI on the anode and compensate for the first cycle losses, but not cycle them reversibly in subsequent cycles. In this case, the total useful energy density of the cell after the formation cycle is increased. The amount of additives to use can be determined depending on the amount of Li needed to form the SEI and the specific capacity of the particular high capacity additive material.

In some designs, it may be advantageous for such a high capacity additive material to be mixed into the electrode during the slurry preparation step. In this case, the selected additive material should be compatible with the solvent used for cathode preparation. This is because in some applications (for example, when such additives enhance electrical or ionic conductivity of the cathode after Li extraction or when they require conductive additives that additionally enhance electrical conductivity of the cathode), it may be desirable for the high capacity additive to be uniformly distributed within the electrode.

In some applications, for example when the material is not compatible with the slurry preparation method used for cathode formulation (e.g., when it does not mix well using the same binder solutions or when it dissolves rapidly in a binder solution used in cathode fabrication), the high capacity additive material can be added into the top layer of the cathode by, for example, spraying or separate casting. This top layer deposition may also be preferable if the high capacity material produces gases during metal ion extraction on the first charge. In some applications (e.g., if some of the products of Li extraction from such additives block ionic transport within the electrode), it may be advantageous for the high capacity additive layer to be deposited between the current collector foil and the cathode layer.

It may be advantageous for the high capacity additive material to be electrochemically active during the first charging cycle, which requires it to be electrically connected to the cathode. In some cases, the additive material can be mixed with conductive additives (such as carbon additives), contain a conductive (e.g., carbon) coating, or form composite particles (or a composite layer) with an electrically conductive material.

In some applications, for example when (i) the high capacity additive material induces undesirable reactions with the electrolyte upon intimate contact or when (ii) intermediate products produced in the course of metal ion extraction from the high capacity additive material dissolve in the electrolyte, it may be advantageous to enclose the high capacity additive material in a metal ion (e.g., Li-ion) permeable (e.g., Li-ion conductive) shell, which is at the same time impermeable to solvent molecules and thus prevents its reaction with electrolyte solvent(s) or dissolution in electrolyte solvent(s).

In some applications, for example when the main cathode material does not have high electrical conductivity, it may be advantageous for the high capacity additive material to serve a dual purpose: first, to provide extra metal ions to compensate for the first cycle losses as described above, and second, to improve electrical conductivity within the cathode. To satisfy the second goal, the high capacity additive material may either be electrically conductive in a "metal ion extracted state" or comprise an electrically conductive material in its structure as an external coating or as a part of the composite. In one example, a carbon coating or shell around individual high capacity additive material particles may provide this needed electrical conductivity. In another example, the high capacity additive material may comprise metal(s) (different than the metal ions participating in ion transport), which enhance the electrical conductivity of the cathode after extraction of Li ions, for example, from the metal atoms containing the high capacity additive material.

Some advantageous although not necessarily required characteristics of such high capacity additive materials include: (i) a volumetric capacity of at least 10% higher than that of the cathode active material, (ii) good chemical stability in contact with air (or at least slow reaction kinetics with air so that the electrode can be processed in air within several hours before assembling into cells), (iii) compatibility with the electrolyte, and (iv) minimum undesirable side reactions within the potential window of cathode operation during cell cycling.

Various compounds may be used for such high capacity additive materials. For example, if one of the common oxides (such as lithium cobalt oxide (LCO), lithium nickel cobalt aluminum oxide (NCA), lithium nickel cobalt manganese oxide (NCM), lithium manganese oxide (LMO), or lithium metal phosphate (LMP)) or oxyfluorides, or other high voltage cathode material, is used as an active cathode material in a Li-ion cell, the use of lithium vanadium oxide (such as $Li_2V_2O_5$ or $Li_3V_2O_5$, LVO) as a high capacity additive material may be advantageous because (i) LVO offers higher volumetric capacity, (ii) LVO is stable in contact with air, (iii) LVO is compatible with many common electrolytes (it does not dissolve significantly in many electrolytes), and (iv) LVO largely does not exhibit undesirable side reactions within 3-4.3 V vs. Li/Li+.

In some embodiments, high Li capacity additive materials, for example, may comprise only two elements, including Li.

One example of such a two-element-containing high capacity additive material is a metal sulfide (such as $Li_2S$ in the case of Li-ion batteries). The theoretical volumetric capacity of $Li_2S$ is 1935 mAh·cc⁻¹, which is more than twice as high as that of commercially used cathodes. Upon complete Li extraction, the produced S may remain as an inactive component of the cathode if it operates within the potential window above 2.5 V vs. Li/Li+(which is typically the case). If the sole or otherwise primary purpose of $Li_2S$ is to provide Li to compensate for the first cycle losses, such operation (the lack of electrochemical activity after the first charge) is advantageous because the intermediate Li-extraction products of $Li_2S$ (such as high order polysulfides—$Li_2S_6$, $Li_2S_8$) may dissolve in the electrolyte and be re-deposited on the anode or cathode, causing self-discharge, decrease in the ionic conductivity of the cell, decrease in the amount of extractable Li, and other undesirable effects. By minimizing the use of $Li_2S$ to only one cycle, such dissolutions can be greatly minimized. Furthermore, if the $Li_2S$ is coated with Li-ion permeable (but polysulfide impermeable) shells, such as carbon shells or nickel shells, the dissolution of polysulfides and generated S interaction with the cathode material may be almost completely eliminated. Such carbon shells can be additionally used as a conductive additive for both the $Li_2S$ and the cathode material.

The desired thickness of such shells may depend on multiple factors, such as $Li_2S$ particle size, Li ion diffusivity, etc. Most commonly, however, shell thicknesses in the range of approximately 1 nm to 50 nm are suitable for metal-ion battery applications. Such protective (e.g., carbon) shells may be deposited by, for example, chemical vapor deposition (e.g., in the course of decomposition of gaseous hydrocarbon precursors) at elevated temperatures (e.g., about 400 to 800° C. in the case of carbon deposition). The deposition temperature may be made sufficiently high to induce shell formation within reasonable time (in less than 24 hours) but sufficiently low so as not to induce decomposition of, or undesirable reactions with, $Li_2S$ material (or other suitable high capacity additives).

The fraction of pores in a typical cathode is a compromise between the high cathode porosity desired for rapid ion transport and high power performance (fast charge or fast discharge, when needed) and the low cathode porosity desired for maximizing the volumetric energy density of a Li-ion cell. Because high capacity materials tend to change volume during Li extraction, this property may be used to optimize cathode density when these high capacity materials are used as high capacity cathode additives. For example, if a high capacity additive material, such as $Li_2S$, is uniformly mixed within the cathode, then the shrinkage of $Li_2S$ (upon Li extraction during the first charge of the cell) will induce formation of pores in the cathode, which may be beneficial for enhancing the ion transport within the cathode. In other words, the initial density of the cathode may be made higher than normal (for the desired high rate operation) to account for the additional pore formation upon Li extraction from high capacity additive materials, such as $Li_2S$.

Another example of the two-element-containing high capacity additive material is a metal selenide (such as $Li_2Se$ in the case of Li-ion batteries). Its properties are somewhat similar to that of a metal sulfide, but due to weaker bonding to metals, the overpotential needed to release Li ions from $Li_2Se$ is smaller, which may be advantageous in some applications. Another example for certain applications is lithium telluride ($Li_2Te$).

In some designs, the high capacity additive material may comprise Li bonded to a gas forming element. In one example, the two-element-containing high Li capacity additive material may be a lithium bonded with nitrogen, such as lithium nitride, $Li_3N$, or lithium azide, $LiN_3$. Although the thermodynamic Li extraction voltage of $Li_3N$ is low (below 0.5 V vs. Li/Li+), due to slow kinetics $Li_3N$ can, in some cases, be stable against decomposition up to 3V or more vs. Li/Li+. Upon Li extraction at higher voltages (first charge of the cell), the released nitrogen gas can be pumped out from the cell. In some cases (e.g., to avoid exposure of the cell to too high of a potential) it may even be advantageous to use catalyst particles to assist in Li extraction from $Li_3N$.

In another example, the two-element-containing high Li capacity additive material may be a lithium oxide, $Li_2O$ (having a theoretical volumetric capacity of 3600 mAh/cc). Similar to the previous example, $O_2$ gas released during the Li extraction ($Li_2O$ decomposition at high potential) can be pumped out of the cell. Due to higher decomposition potential, in some cases (e.g., to avoid exposure of the cell to too high of a potential) it may be advantageous to use catalyst particles in direct contact with $Li_2O$ to assist in Li extraction from $Li_2O$ at lower potentials.

In addition to $Li_2O$, some lithium salts, where lithium is bonded to oxygen and oxygen is bonded to nonmetals, such as Si, C, P, B, S, and Se, have been found to work well as high Li capacity additives. Specific examples include: Li silicate (ortho and metha forms) $Li_4SiO_4$ (or $Li_2SiO_3$); Li phosphate (ortho and methaforms) $Li_3PO_4$ (or $LiPO_3$); Li Borate (ortho and metha forms) $Li_3BO_3$ (or $LiBO_2$); Li dithionite $Li_2S_2O_4$; Li carbonate $Li_2CO_3$. In order to facilitate solubilization of those additives complexating agents can be added to the electrolyte. The latter include, but not limited to, crown ethers, azacrown ethers, tertiary amine dendrimers, and polyamines. Specifically suited for this purpose is the addition of 12-crown-4, which has a large affinity to Li ions.

In addition, some lithium salts, where lithium is bonded to oxygen and oxygen is bonded to some of the suitable metals, such as Al (as, e.g., in $LiAlO_2$ or $Li_3AlO_3$) or Fe (as, e.g., in $Li_3FeO_3$ or $Li_2FeO_2$) or other metals as described below, have been found to work well as high Li capacity additives. The major requirement to form LixMeyOz type of compounds is that the metal ion should have an amphoteric nature. In other words, metal oxide MexOy should possess acidic properties when reacted with strongly basic $Li_2O$. Examples of suitable amphoteric metal ions (for use in such high capacity Li additive compounds) include, but are not limited to, $Cu^{2+}$, $Fe^{3+}$, $Fe^{2+}$, $Zn^{2+}$, $Al^{3+}$, $Mn^{2+}$, $Be^{2+}$, $Ge^{4+}$, $Ga^{3+}$, and $Sn^{2+}$. Ions of Al, Be, Ge, Ga, and Sn were found to be more favorable than Fe, Zn, Cu, and Mn in some applications, due to their better resistance against dissolution in some electrolytes, particularly when cathodes are exposed to elevated temperature (above approximately 40° C.) and high voltage (above approximately 4.3 V vs. Li/Li+) during charging. The generalized stoichiometry of these suitable Li containing additives is: $Li_xMe^{x+}O_x$, where x is an oxidative state of the non-Li metal (Me). Metals (Me) with an oxidative state of 3+(or 4+) can form meta- and ortho-forms of such oxides, such as meta-$LiMeO_2$ ($Li_2MeO_3$) and ortho-$Li_3MeO_3$ ($Li_4MeO_4$).

Yet another example of a high capacity additive material composed of Li bonded to a gas forming element is a lithium fluoride, LiF. Since fluorine gas released during the Li extraction from LiF is toxic, a transition metal may be added into this compound either forming lithium metal fluorides or an intimate mixture of LiF and a transition metal nanoparticle. Upon Li extraction at a sufficiently high potential (within the potential of cathode operation), F atoms may bond to a transition metal forming transition metal fluoride compounds. In this way, toxic gas release can be avoided or at least reduced.

In addition to metal fluorides, other metal halogenides, such as chlorides, iodides and bromides (e.g., LiCl, LiI, LiBr) may be used in some applications as useful additive(s). However, care should be taken so as to avoid inducing damage to the cell. For example, $Cl_2$ released during Li extraction may interact with Al inducing its corrosion, if Al is used as a current collector and if Al is not protected against such corrosion using a protective coating layer (such as carbon, a carbon-polymer composite layer, a thin $AlF_xO_y$ coating, or other corrosion protective layers). Iodine may dissolve in most electrolytes, thus causing redeposition on the anode and triggering formation of LiI, re-consuming Li. Iodine may also corrode aluminum. LiBr is extremely hygroscopic and needs to be dried extensively prior to incorporation into the cell. In some applications when corrosion of the current collectors can be avoided or significantly minimized, the additions of LiI, LiCl, and LiBr salts to the electrolyte was found to improve the cell rate performance, energy efficiency, and cycle stability (provided the cathode and anode current collectors are not corroding or are protected from I-, Cl-, or Br-induced corrosion). Without being bound to a particular theory, it is believed that the decomposition of such salts in electrolytes may induce a formation of a favorable layer on the surface of one or both electrodes, which prevents some of the undesirable side reactions and improves the rate performance and cycle life of the cell.

In some cases, the presence of lithium imide(s) (e.g., $FSO_2N^-(Li^+)SO_2F$ or $CF_3SO_2N^-(Li^+)SO_2CF_3$) or other primary salt(s) (e.g. $LiPF_6$) together with LiF-, LiI-, LiCl-, or LiBr-comprising electrodes or electrolytes is advantageous for SEI formation or Li doping of one of the electrodes (e.g., an anode). In particular, in cells with electrodes (e.g., anodes) comprising silicon (Si), tin (Sn), or aluminum (Al), the favorable impact(s) of such salt combinations is significant. Here, again, care should be taken in order to avoid corrosion of the current collectors or the metal coatings exposed to high voltages (e.g., in the absence of $LiPF_6$ imide salts and halides may, for example, corrode Al at potentials above approximately 4 V vs. Li/Li+). Similarly, cells with high capacity cathodes comprising various metal fluorides (e.g., $CuF_2$, $CoF_2$, $CoF_3$, $FeF_2$, $FeF_3$, $BiF_3$, AgF, LiF, and others), the favorable impact(s) of such salt additives is also significant, particularly if the initial cell cycling is conducted at sufficiently high voltages, where conversion reaction between various metal fluoride cathode(s) and lithium does not take place. Furthermore, the positive impact of such compounds in the electrolyte is apparent in cells comprising lithium titanate (LTO) anodes and sulfur-comprising cathodes ($Li_2S$-comprising cathodes).

In some cases, the presence of some of the lithium imides (and some of the non-lithium imides) in electrolytes without LiI, LiCl, or LiBr improves cell performance. $FSO_2N^-(Li^+)SO_2F$ is as an example of a suitable Li imide salt. $(FSO_2N^-)_2(Mg^{2+})(SO_2F)_2$ or the same imide salt of rare earth elements (e.g., La) are examples of suitable non-Li imide salts. In particular, in cells with anodes comprising silicon (Si) or tin (Sn) or aluminum (Al) as a high capacity Li-ion storage material, the favorable impact(s) of such salts and salt additives is significant. Similarly, cells with high capacity cathodes comprising various metal fluorides (e.g., $CuF_2$, $CoF_2$, $CoF_3$, $FeF_2$, $FeF_3$, $BiF_3$, LiF, AgF and others), the favorable impact(s) of such salt additives is also significant. Such favorable impacts may be particularly significant if the initial cell cycling is conducted at sufficiently high voltages, where conversion reactions between various metal fluoride cathode(s) and lithium does not take place. It is believed that in this case a favorable solid surface layer forms around such fluoride-comprising cathodes. Furthermore, the positive impact of such compounds in electrolyte is visible in cells comprising lithium titanate (LTO) anodes and sulfur-comprising cathodes. Furthermore, conducting at least one initial cycle at elevated temperatures in the range from 30 to 80° C. (more preferably between 45 and 70° C.) is particularly advantageous in cells with suitable electrolyte composition (e.g., when $FSO_2N^-(Li^+)SO_2F$ or other suitable Li or non-Li imide salt(s) is/are present in the electrolyte). Without being bound to a particular theory, it is believed that the decomposition of electrolytes in the presence of such salts or salt mixtures at room or elevated temperatures may induce a formation of a favorable layer on the surface of one (e.g., Si-comprising anode) or both electrodes, which prevents some of the undesirable side reactions and improves the rate performance and cycle life of the cell.

In some designs, the use of some quantities (e.g., from as little as 0.001M to as much as 8M, depending on the application) of LiI, LiBr, LiCl, $FSO_2N^-(Li^+)SO_2F$, $(FSO_2N^-)_2(Mg^{2+})(SO_2F)_2$, $(FSO_2N^-)_3(La^{3+})(SO_2F)_3$, or other imide salts and their combinations as additives to electrolytes in regular cells (without "high capacity additives" or without "sacrificial salt" additives) can improve cell performance and be advantageous. In general, such additives can also be added to the electrodes or membranes and slowly dissolve into electrolytes after electrolyte-filling the cells. In regular cells with anodes comprising silicon (Si) or tin (Sn) as high capacity Li-ion storage material, the favorable impact(s) of such additives are most significant. Similarly, cells with high capacity cathodes comprising various metal fluorides (e.g., $CuF_2$, $CoF_2$, $CoF_3$, $FeF_2$, $FeF_3$, $BiF_3$, AgF, LiF, and others), the favorable impact(s) of such salt additives is also significant. Furthermore, the positive impact of such compounds in the electrolyte is apparent in cells comprising lithium titanate (LTO) anodes and sulfur-comprising cathodes (such as $Li_2S$ comprising cathodes). In the case of a $FSO_2N^-(Li^+)SO_2F$ additive (or other suitable Li or non-Li imide salt(s) present in the electrolyte, such as $(FSO_2N^-)_3(La^{3+})(SO_2F)_3$), conducting at least one initial cycle at elevated temperatures in the range of 30 to 80° C. (more preferably between 45 and 70° C.) is particularly advantageous. Furthermore, the use of $FSO_2N^-(Li^+)SO_2F$ as a primary salt for Li-ion cells and conducting at least one initial cycle at elevated temperatures in the range of 30 to 80° C. (more preferably between 45 and 70° C.) is advantageous, particularly if Si-, Sn-, Al-, or LTO-comprising anodes and/or metal fluorides or $Li_2S$-comprising cathodes are used in these cells.

Without being bound to a particular theory, it is believed that the decomposition of electrolytes in the presence of such salts may induce a formation of a favorable layer on the surface of one or both electrodes, which prevents some of the undesirable side reactions and improves the rate performance and cycle life of the cell. Similarly, without being bound to a particular theory, conducting at least one of the initial cycles at elevated temperatures may trigger a more favorable surface layer (such as SEI on Si comprising anodes), possibly due to cross-linking within the surface layer or stronger bonding between the surface layer and the particles.

In yet another example, in order to optimize the Li extraction potential, the high capacity additive material may comprise Li bonded to two or more gas-forming elements. An example of such a compound is a lithium oxidinitride $Li_xO_yN_z$ (where x, y and z are atomic fractions of Li, O and N, which may determine the potential range at which Li may be extracted).

It is to be appreciated that in designs where the high capacity additives decompose forming a gaseous product(s) (e.g., Li bonded to a gas forming element, whereby Li is released in conjunction with the gaseous product), the high capacity additives may be added to either the cathode or the anode.

It is also to be appreciated that in designs where the high capacity additives within the cathode exhibit low cycle life or other unfavorable properties (e.g., in some cases when $Li_2S$ or $Li_2Se$ additives are used), it may be preferable that the cell is not regularly discharged to the level when the cathode potential is reduced so low that Li becomes re-inserted into such poor (although high capacity) cathode materials, which may lead to cell performance degradation.

In some configurations, either electrolyte, electrolyte solvent, or electrolyte solvent mixtures utilized during the above-discussed process of Li doping (from either the high capacity additive cathode material or sacrificial Li salt) may be replaced with another electrolyte (or electrolyte solvent or electrolyte solvent mixtures) prior to battery use to achieve a more favorable performance in different applications. There are multiple potential advantages of this process. In a Li-ion battery, for example, the electrolyte composition may be optimized to achieve the most favorable overall performance, such as (i) forming a good and long-lasting (during cycling) passivating layer on the anode (e.g., forming the most favorable SEI), (ii) forming a good and long-lasting (during cycling) passivating layer on the cathode, (iii) providing high ionic conductivity through the electrode and the separator membranes during operation in a broad temperature window (sometimes as low as −40° C.), (iv) providing certain flame retarding properties, and others. When the first cycle (one or a first few cycles) are conducted in order to "dope" an electrode (e.g., an anode) with Li (e.g., from a sacrificial salt or a high capacity cathode additive) and establish favorable SEI on the anode, the desired properties for the electrolyte might be very different. For example, in this case, the primary concern may be to produce the best SEI properties at the temperature at which the SEI formation takes place. Other desirable qualities may include: (i) maintaining cell stability during the doping process (which includes, for example, the lack of unfavorable reactivity between the salts and the solvents used in the electrolyte, etc.), (ii) high solubility of "sacrificial salts" (if they are used), and (iii) high rate performance (so that Li doping of the anode may be conducted rapidly, if desired to reduce the cost of the procedure), to name a few. At the same time, other properties, such as the long term electrolyte stability on the cathode or the good performance at low or high temperatures may not be of concern if the electrolyte can be replaced prior to final cell assembly and use.

Composition of the solvent or solvent mixtures within the electrolyte used during the Li doping and/or SEI formation on the anode depends on several factors, such as the composition of the salt(s) in the electrolyte, the composition of the anodes and cathodes, whether or not the electrolyte is to be replaced after the SEI "formation" or "Li doping" procedures, etc. If the same electrolyte is used for future operations of the doped cell, then performance characteristics of such a cell in the desired applications have to be explored in order to select the most favorable solvent composition. Several suitable examples are provided below. It will be appreciated, of course, that other solvents may also be suitable.

Various carbonates and carbonate mixtures are typically used in commercial Li-ion batteries with $LiPF_6$ as an electrolyte salt. If such solvents do not unfavorably react with "sacrificial salts" or high capacity cathode additives, they may be used in cells that undergo the discussed "doping" or SEI formation procedures. Ethylene carbonate (EC), vinylene carbonate (VC), vinyl ethylene carbonate (VEC), fluoroethylene carbonate (FEC), and other carbonates are often employed in such electrolytes in order to form an SEI on the low voltage anodes (anodes with an average potential less than about 1.2 V vs. Li/Li+, such as graphite, silicon, tin, and other suitable anodes) with favorable properties. FEC, VEC, and VC are particularly useful for forming a good SEI on anodes comprising silicon and/or carbon as active materials. Higher content of such additives generally improves the SEI on low voltage anodes, but reduces rate performance of the cells, particularly at low temperatures. This is because such solvents have very high melting points. For example, VC and FEC have melting temperatures as high as approximately 20° C. In contrast, dimethyl carbonate (DMC), diethyl carbonate (DEC), dipropyl carbonate (DPC), ethyl methyl carbonate (EMC), propylene carbonate (PC), and other carbonates have significantly lower melting point and are often used as co-solvents with EC, FEC, and other SEI-forming solvents for regular Li-ion cells and may similarly be used for the above-discussed ion doping application (e.g., Li doping). In the case when the cell electrolyte is at least partially replaced after Li doping, a high content of FEC, VEC, or VC, or their mixtures (e.g. 10 to 100 wt. % relative to other solvents in the electrolyte) may be used for the initial Li "doping" or SEI formation cycles to achieve better SEI quality. After this Li doping, the electrolytes comprising a high content of the SEI-forming carbonates (such as FEC, VEC, and VC) may be replaced with those that have low (e.g., 1 to 10 wt. % of FEC, VC, or VEC, or their mixtures relative to other solvents in the electrolyte) or more moderate (e.g., 10 to 30 wt. % of FEC, VC, or VEC or their mixtures relative to other solvents in the electrolyte) content of such carbonates. The rest of the solvents may comprise other (one or more) carbonate(s) with low (e.g., −100 to −10° C.) and/or moderately low (e.g., −10 to +10° C.) melting points. Other, non-carbonate solvents may also be useful as long as they do not induce undesirable reactions with electrodes during cell operation. For example, various nitriles (such as acetonitrile (AN)), various sulfites (such as fluoroethylene sulfite (FES), vinylene sulfite (VS), vinyl ethylene sulfite (VES), ethylene sulfite (ES), dimethyl sulfite (DMS), diethyl sulfite (DES), dipropyl sulfite (DPS), ethyl methyl sulfite (EMS), propylene sulfite (PS), and others), various esters (including cyclic esters), various ethers, and various lactones have been found to be compatible with some cell and salt chemistries, and thus are suitable for use in certain embodiments herein. In fact, the use of some of these solvents (such as FES, VS, ES, DES, VES, and others) in electrolytes may lead to the formation of favorable SEI on the electrodes. However, some nitriles, esters, ethers, and lactones are not compatible with some other cell chemistries. For example, acetonitrile and ethers are generally not compatible with graphite anodes. When graphite anodes are lithiated they decompose and induce formation of unfavorable decomposition reaction products. However, a small content of such solvents (e.g., 0.001 to 20 wt. % relative to the rest of the solvents in the electrolyte) can be used in electrolyte mixtures, particularly if SEI on a graphite anode is pre-formed with a different, more compatible electrolyte. Ether solvents (such as dimethoxyethane, DME, or 1,3-dioxolane, DOL) are typically not compatible with an $LiPF_6$ salt, but small amount of such solvents (e.g., 0.001 to 20 wt. % relative to the rest of the solvents in electrolyte) may be used as well in some designs. At the same time, nitriles, ethers, some esters, and some lactones (e.g., gamma-butyrolactone) are generally compatible with LTO anodes.

Methods of fabricating a higher energy density battery are also provided. According to such methods, high capacity additives (such as sacrificial Li salts, other suitable salts, high capacity Li containing cathode materials, etc.) are incorporated into the electrode or the separator, or are a part of the electrolyte composition. Upon the application of a suitable potential difference between an anode and a cathode and the resulting metal ion (e.g., Li) extraction from these additives, the products of de-lithiatiation (or decomposition) of such additives are either removed from the battery cell (prior to the final cell sealing) or left within the cell. If at least some of the products of additive(s) decomposition are gaseous, their removal may be accomplished by the application of a vacuum. If the products of additive(s) decomposition remain soluble in the electrolyte, they may be removed, for example, by changing the electrolyte.

If exposing a cathode to too high (undesirably high) of a voltage during Li doping (which could be needed for Li extraction from the additives) is undesirable (for example, because such an exposure leads to the formation of an unfavorable surface film on the cathode or induces cathode degradation or cathode-catalyzed electrolyte decomposition) and if the "sacrificial salts" may be incorporated into (dissolved within) the electrolyte, then Li doping of the anode may be accomplished by applying a potential between an anode and another "removable" counter current collector (a third electrode). In order to increase the energy density of such cells, this counter electrode may be removed prior to final cell assembling or cell sealing.

Similarly, for Li doping a cathode, if it is undesirable to expose an anode to a relatively low voltage during Li doping (which may be needed for Li extraction from the additives), for example, because such an exposure leads to the formation of an unfavorable surface film on the anode or induces anode degradation or undesirable electrolyte reduction, and if the "sacrificial salts" may be incorporated into (dissolved within) the electrolyte, then Li doping of the cathode may be accomplished by applying a potential between an anode and another "removable" counter current collector (third electrode). In order to increase the energy density of such cells, this counter electrode may be removed prior to final cell assembling or cell sealing.

In some designs, it may be advantageous to keep a large average separation distance between the cell anode and cathode (or between the electrodes and a removable current collector, if one is used) during the Li doping. A larger distance allows higher content of the electrolyte and thus (if the Li source, such as a Li sacrificial salt, is dissolved in the electrolyte) a higher content of Li to be introduced into the system. Furthermore, if the separation distance is sufficiently large, one can flow electrolyte between the electrodes so that fresh electrolyte with more Li is continuously supplied. This further increases the rate of Li doping and ensures better control over the SEI composition. In addition, it may improve removal of decomposition products from the system (in cases when such products are dissolved or dispersed in the electrolyte). Furthermore, by changing the composition of the electrolyte and the direction of the current (or, more generally, the electrochemical protocol for Li introduction into the electrode(s)) in real time, the properties of the SEI on the anode and the cathode can be independently tuned. Finally, another solvent can be used to remove the rest of the electrolyte used and (with or without subsequent drying of the cell) infiltrate the cell with the new (application-specific) electrolyte prior to cell compression and subsequent sealing. This new electrolyte may have higher stability at elevated temperatures or higher stability at reduced temperatures, or better rate performance or other benefits for the cell operation.

In some designs, it may be advantageous to dissolve certain gases in the electrolytes during Li doping of the anode in order to improve the properties of the SEI. For example, $CO_2$ and $SO_2$ gases (when dissolved in electrolyte solvents) may improve the SEI on the surface of the electrodes (e.g., on the surface of a low potential anode, such as graphite- or Si-comprising anodes). Therefore, saturating the electrolyte with such gases (e.g., by bubbling the gases though the electrolyte solution) may be advantageous during the above-discussed Li doping of anodes. In order to increase the solubility of these gases in electrolytes, heating the electrolyte to elevated temperatures (e.g., from around 30 to around 70° C.) may be advantageous in some designs.

Figure 2A:
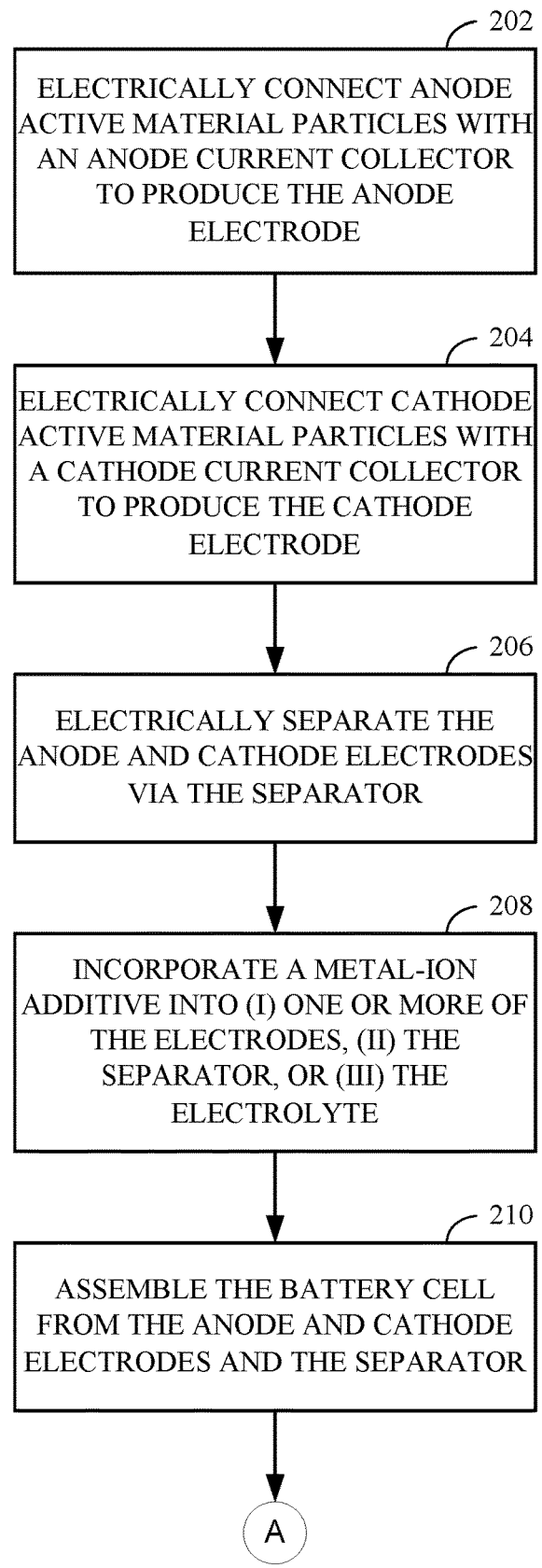
FIGS. 2A-2B illustrate an example method of fabricating a metal-ion battery cell from anode and cathode electrodes, a separator, and an electrolyte.
Figure 2B:
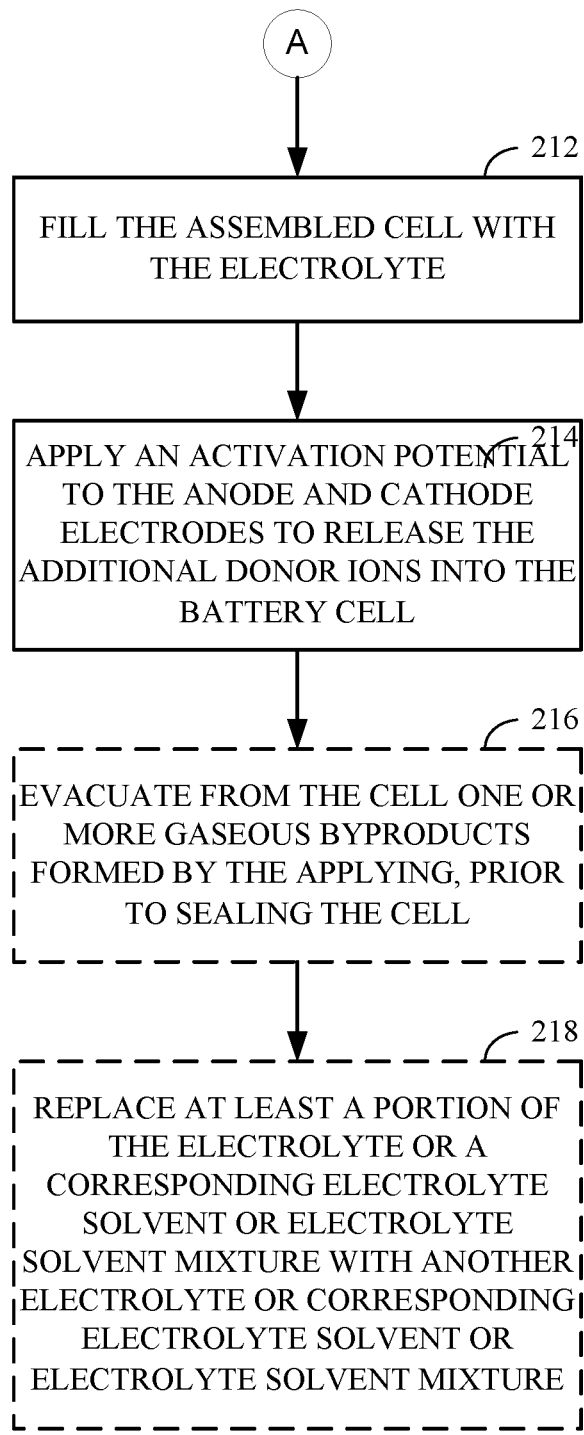

FIGS. 2A-2B illustrate an example method of fabricating a metal-ion battery cell from anode and cathode electrodes, a separator, and an electrolyte. As shown, the method may comprise, for example: electrically connecting anode active material particles with an anode current collector to produce the anode electrode, wherein the anode active material particles are provided to store and release metal ions during battery operation (block 202); electrically connecting cathode active material particles with a cathode current collector to produce the cathode electrode, wherein the cathode active material particles are provided to store and release metal ions during battery operation (block 204); electrically separating the anode and cathode electrodes via the separator (block 206); incorporating a metal-ion additive into (i) one or more of the electrodes, (ii) the separator, or (iii) the electrolyte, wherein the metal-ion additive provides additional donor ions corresponding to the metal ions stored and released by the anode and cathode active material particles (block 208); assembling the battery cell from the anode and cathode electrodes and the separator (block 210); filling the assembled cell with the electrolyte (block 212); and applying an activation potential to the anode and cathode electrodes to release the additional donor ions into the battery cell (block 214).

As discussed in more detail above, in some designs, the method may further comprise evacuating from the cell one or more gaseous byproducts formed by the applying, prior to sealing the cell (optional block 216).

The method may also further comprise replacing at least a portion of the electrolyte or a corresponding electrolyte solvent or electrolyte solvent mixture with another electrolyte or corresponding electrolyte solvent or electrolyte solvent mixture selected for compatibility with a given application for the battery cell (optional block 218). In some designs, the other electrolyte or corresponding electrolyte solvent or electrolyte solvent mixture may be selected based on SEI formation characteristics. In other designs, the other electrolyte or corresponding electrolyte solvent or electrolyte solvent mixture may be selected based on cost and performance tradeoff characteristics that are offset by the additional donor ions.

As also discussed above in more detail, the metal-ion additive may comprise, for example, a sacrificial salt, where applying the potential induces decomposition of the sacrificial salt to release the additional donor ions to one of the electrodes (e.g., the anode). The sacrificial salt may be incorporated into the electrolyte. The sacrificial salt may be incorporated in an amount selected based on a quantity of additional donor ions associated with SEI layer formation on the anode electrode and the specific capacity of the sacrificial salt. The sacrificial salt may comprise, for example, lithium nitrite $LiNO_2$, lithium sulfite $Li_2SO_3$, lithium carbonate $Li_2CO_3$, lithium acetate $CH_3COOLi$, lithium chloride LiCl, or Li iodide LiI.

As also discussed above in more detail, the electrolyte solvent composition utilized for the Li donation procedure may comprise various SEI-forming additives, such as dissolved $CO_2$ and $SO_2$ gases, FEC, VC, and other suitable additives.

In addition or as an alternative, as also discussed above in more detail, the metal-ion additive may comprise a high capacity active material additive, where the incorporating comprises incorporating the high capacity active material additive into the cathode electrode and the applying comprises extracting the additional donor metal ions from the high capacity material additive to dope the anode electrode with the additional donor metal ions. The high capacity active material additive may be selected to have at least a 10% higher volumetric capacity than the active material used for the cathode active material particles. The high capacity active material additive may also be selected to be stable in dry air. The high capacity additive material may be incorporated in an amount selected based on a quantity of additional donor ions associated with SEI layer formation on the anode electrode and the specific capacity of the high capacity active material additive. The high capacity additive material may also be selected so as to not be involved in storing and releasing metal ions during regular cell operation. As an example, the high capacity additive may comprise $Li_2S$ or $Li_2Se$.

In some designs, the cathode particles, the anode particles, or the metal-ion additives may be encapsulated by metal shells permeable to Li ions.

Figure 3A:
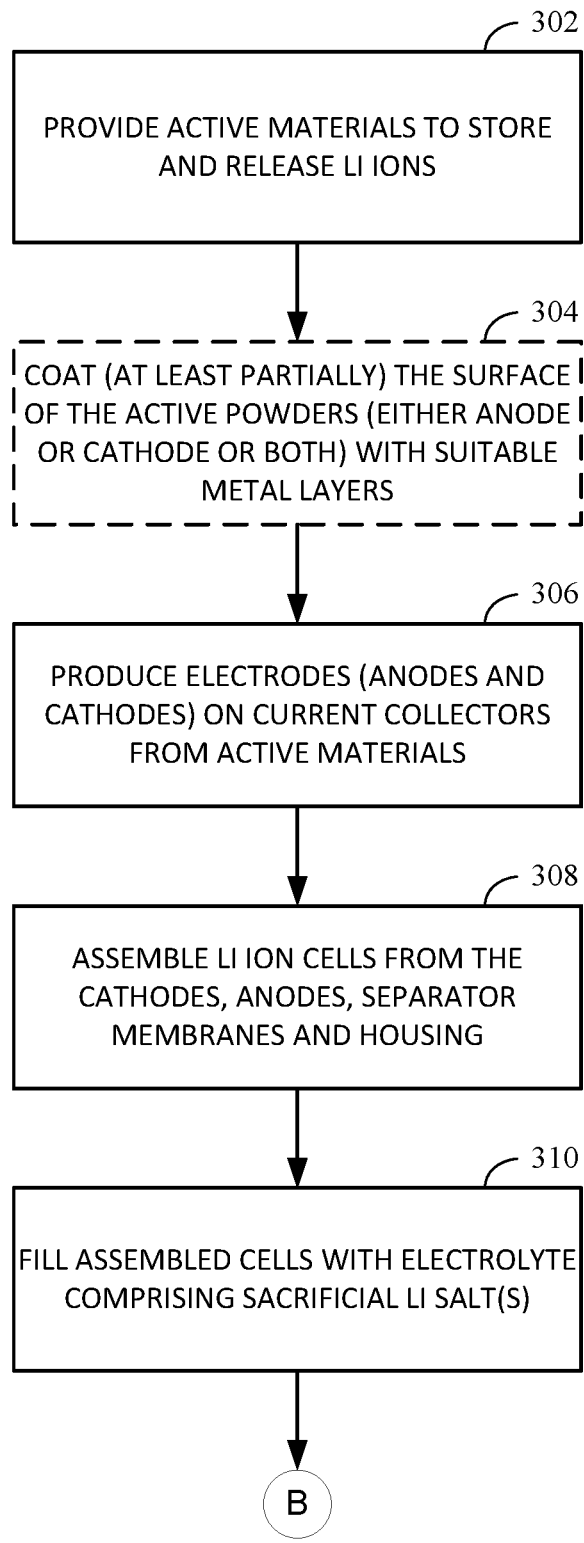
FIGS. 3A-3B illustrate an example Li doping fabrication method for constructing a Li-ion battery.
Figure 3B:
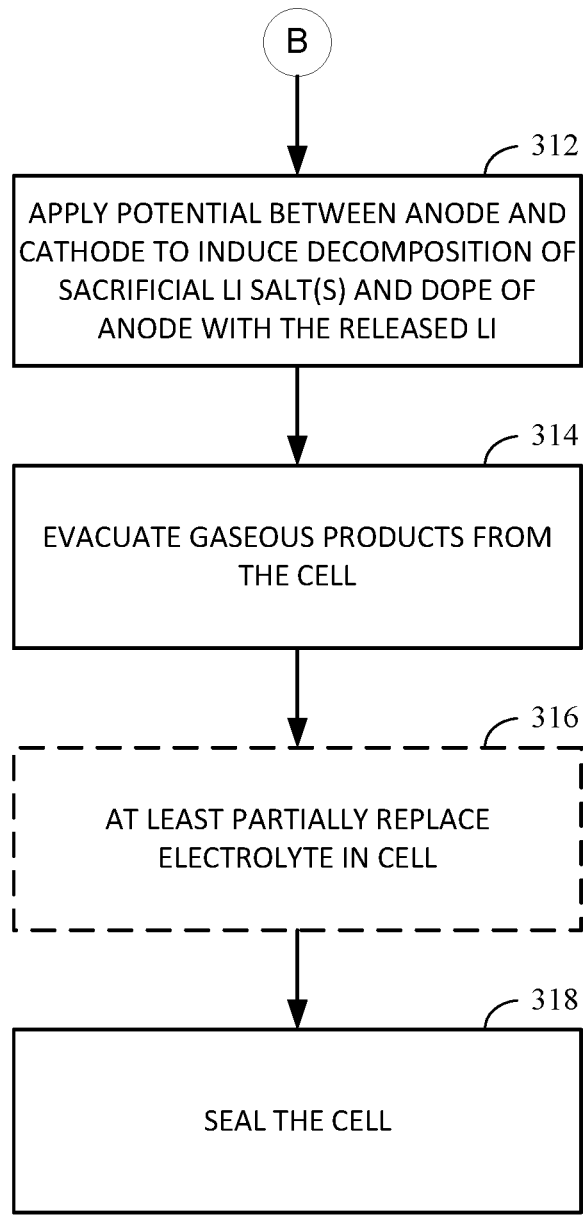

FIGS. 3A-3B illustrate an example Li doping fabrication method for constructing a Li-ion battery. As shown and described above in more detail, the method may comprise, for example: providing active material particles to store and release ions during battery operation (block 302); electrically connecting the anode active particles with the anode current collector, and electrically connecting the cathode active particles with the cathode current collector (for connecting the active particle together during the electrode fabrication, this method may involve mixing the active particles with a binder) (block 306); assembling the cell comprising the produced anode and cathode (block 308); filling the assembled cell with an electrolyte comprising sacrificial Li ion salts (block 310); applying the potential to the electrodes in order to induce decomposition of the sacrificial salts and release of Li ions to one of the electrodes (e.g., anode) (block 312); and evacuating the gaseous products from the cell (block 314) prior to compressing and sealing the cell (block 318). In some designs, prior to sealing, the method may (optionally) involve at least partial replacement of the electrolyte used for the "Li doping" of the anode with another electrolyte that provides more favorable performance in certain applications of the produced high energy density Li ion battery (optional block 316). In some designs, the active powers may be coated with suitable metal layers or metal-ceramic (e.g., oxide, fluoride, or oxyfluoride) bi-layers (optional block 304).

Figure 4A:
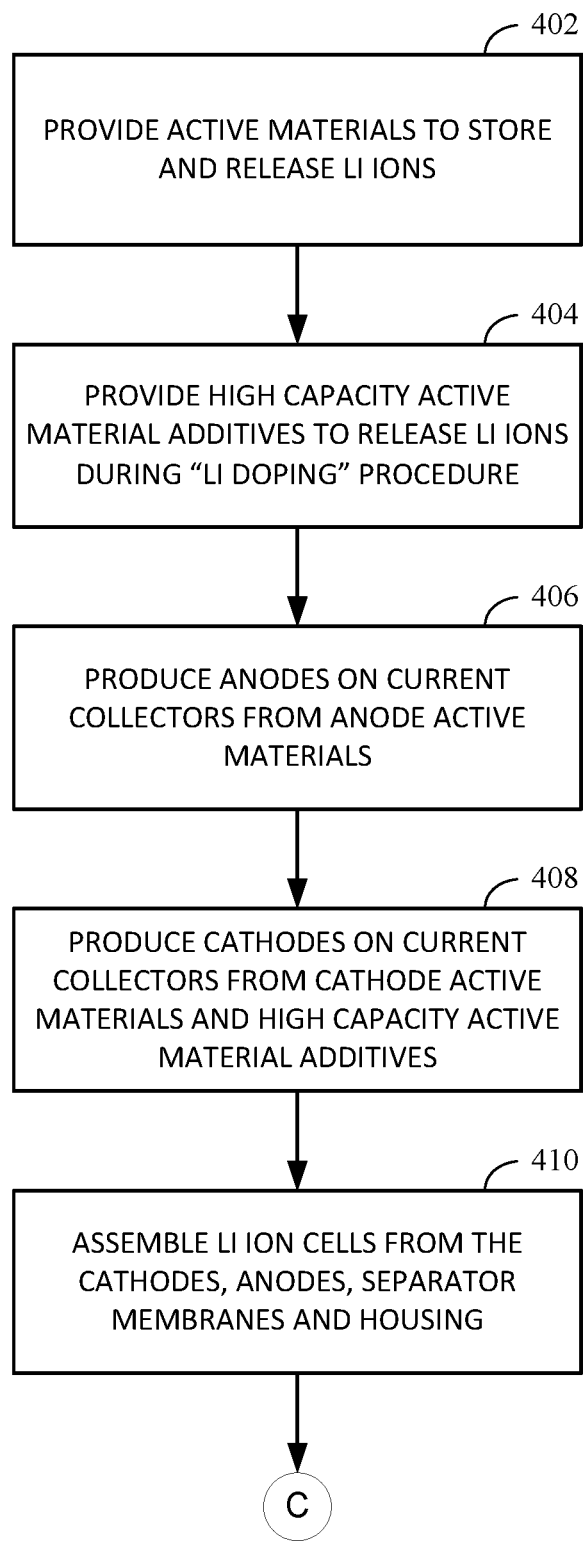
FIGS. 4A-4B illustrate another example Li doping fabrication method for constructing a Li-ion battery.
Figure 4B:
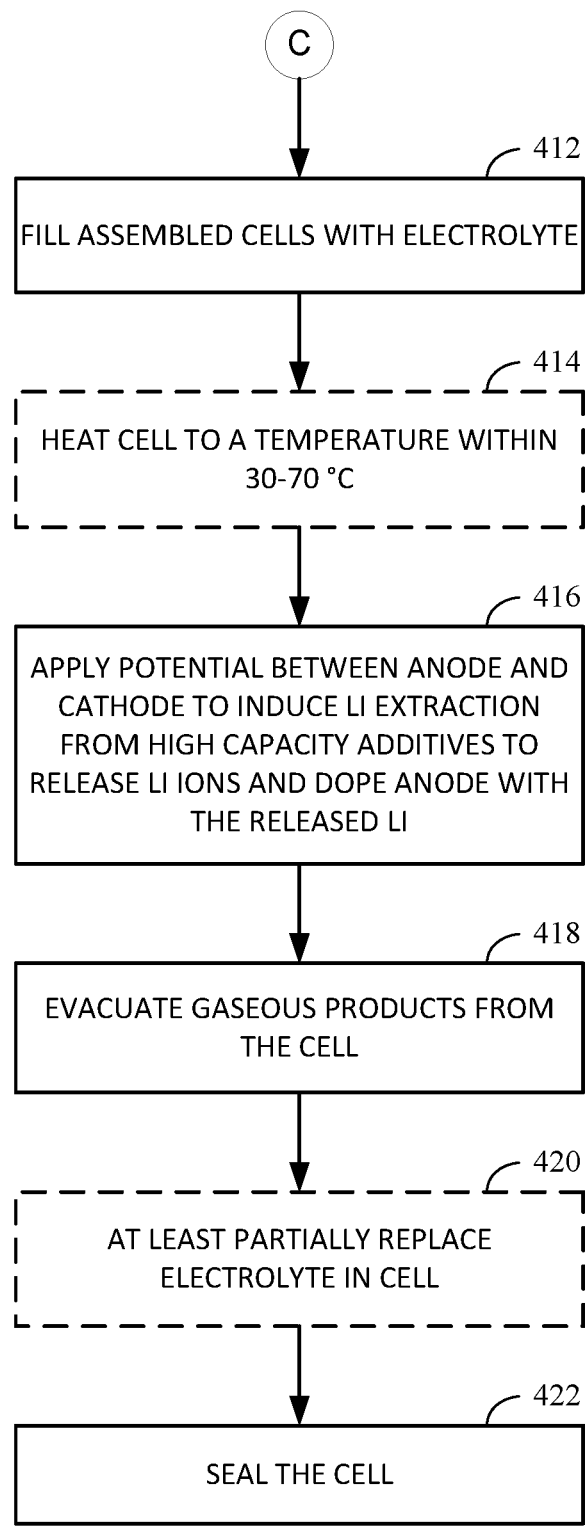

FIGS. 4A-4B illustrate another example Li doping fabrication method for constructing a Li-ion battery. The method may comprise, for example: providing active material particles to store and release ions during battery operation (block 402); providing a suitable high capacity active material additive to release Li ions during a "Li doping procedure" (block 404); electrically connecting the anode active particles with the anode current collector (block 406); electrically connecting the cathode active particles with the cathode current collector, where at least one of the electrodes (e.g., the cathode) additionally incorporates and electrically connects the high capacity active material additive within the electrode (block 408); assembling the cell comprising the produced anode and cathode (block 410); filling the assembled cell with an electrolyte (block 412); applying the potential to the electrodes in order to extract Li from the high capacity material additive and utilize the extracted Li ions to "Li dope" the anode (block 416); and evacuating the gaseous products from the cell (if formed) (block 418) prior to compressing and sealing the cell (block 422). In some designs, Li doping may be conducted at elevated temperatures (for example, at temperatures within the 30-70° C. range) (optional block 414). In some designs, prior to sealing, the method may involve at least partial replacement of the electrolyte used during the "Li doping" of the anode with another electrolyte that provides more favorable performance in certain applications of the produced high energy density Li ion battery (optional block 420).

Figure 5A:
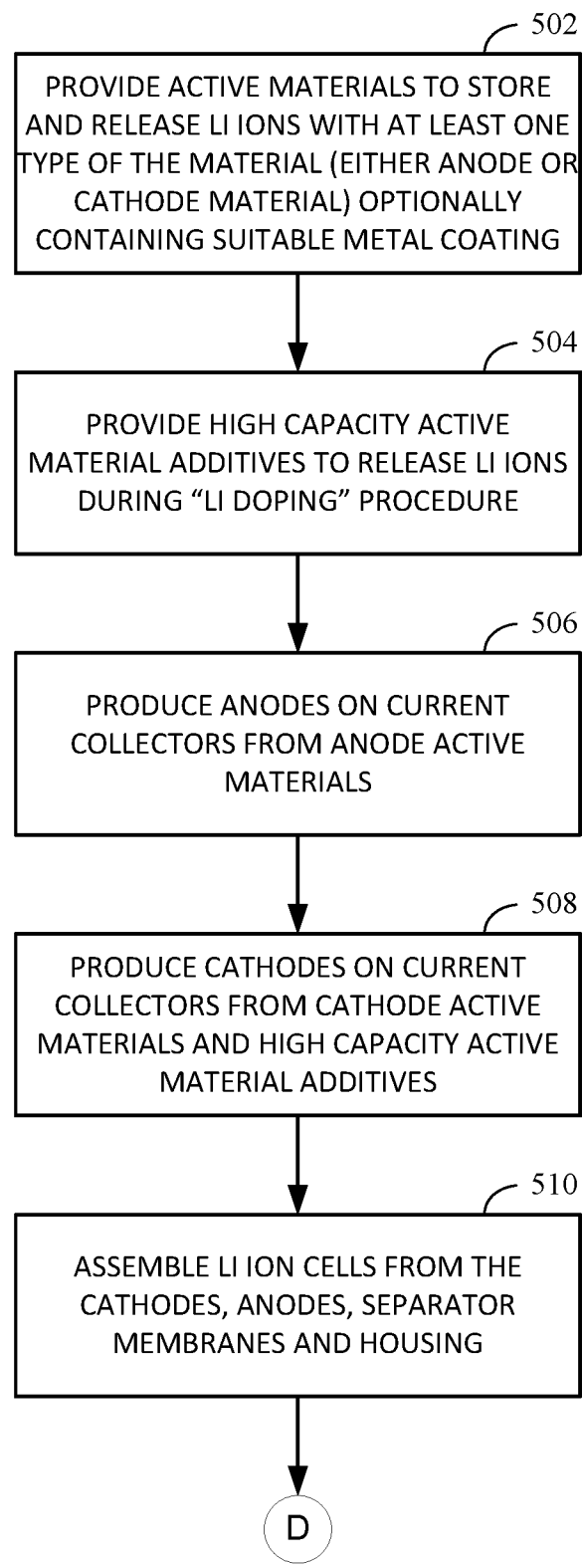
FIGS. 5A-5B illustrate another example Li doping fabrication method for constructing a Li-ion battery.
Figure 5B:
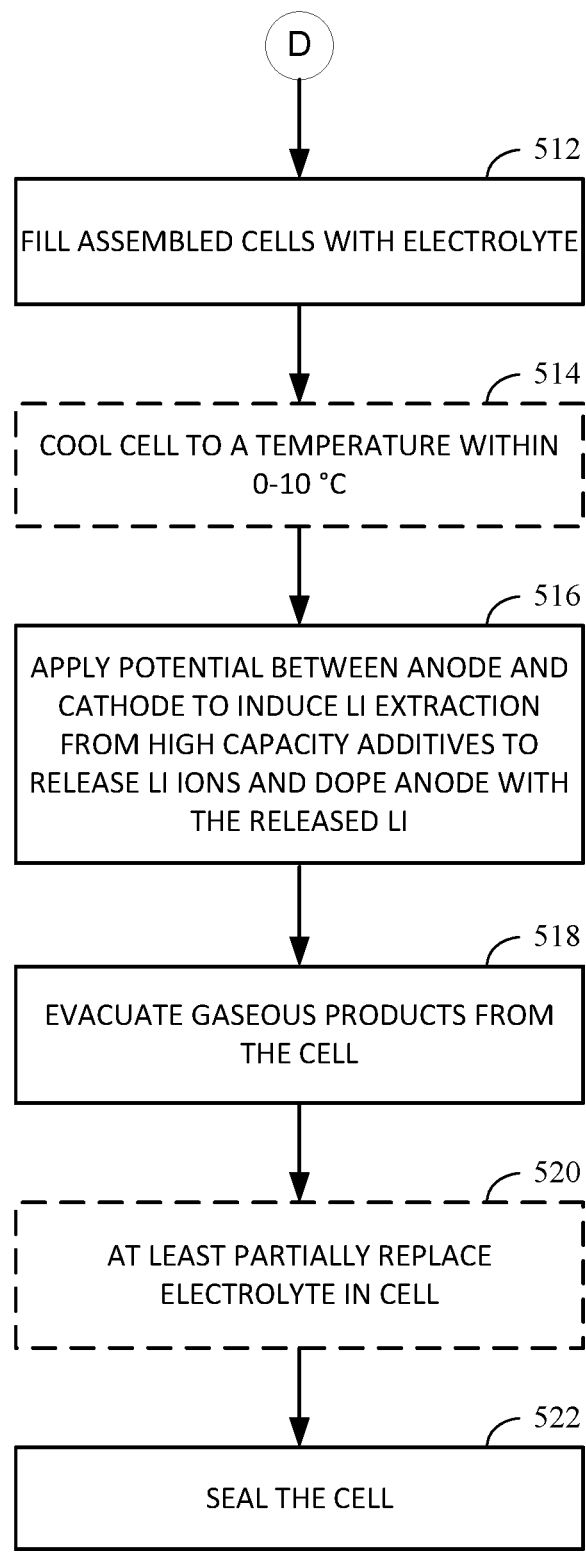

FIGS. 5A-5B illustrate another example Li doping fabrication method for constructing a Li-ion battery. The method may comprise, for example: providing active material particles to store and release ions during battery operation, where either anode or cathode (or both) types of particles optionally contain a suitable metal layer (or metal-ceramic bi-layer) coating (block 502); providing a suitable high capacity active material additive to release Li ions during the "Li doping procedure" (block 504); electrically connecting the anode active particles with the anode current collector (block 506); electrically connecting the cathode active particles with the cathode current collector, where at least one of the electrodes (e.g., the cathode) additionally incorporates and electrically connects the high capacity active material additive within the electrode (block 508); assembling the cell comprising the produced anode and cathode (block 510); filling the assembled cell with an electrolyte (block 512); applying the potential to the electrodes in order to extract Li from the high capacity material additive and utilize the extracted Li ions to "Li dope" the anode (block 516); and evacuating the gaseous products from the cell (if formed) (block 518) prior to compressing and sealing the cell (block 522). In some designs, Li doping may be conducted at reduced temperatures (for example, at temperatures within the 0-10° C. range) (optional block 514). In some designs, prior to sealing, the method may involve at least partial replacement of the electrolyte used during the "Li doping" of the anode with another electrolyte that provides more favorable performance in certain applications of the produced high energy density Li ion battery (optional block 520).

Figure 6A:
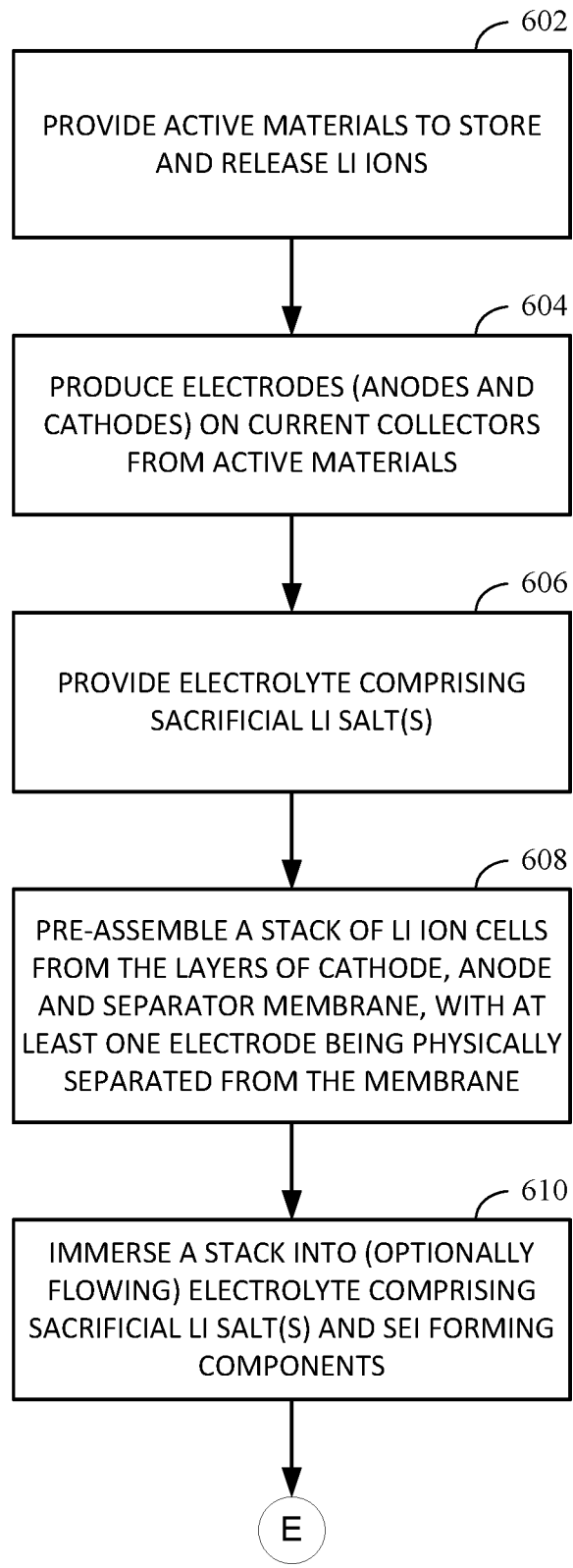
FIGS. 6A-6B illustrate another example Li doping fabrication method for constructing a Li-ion battery.
Figure 6B:
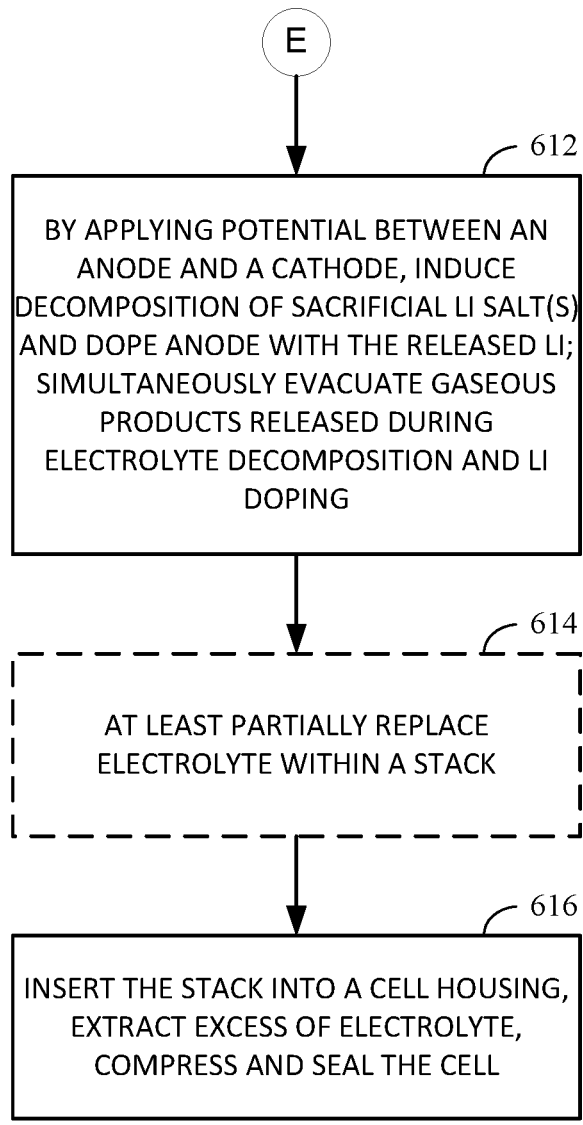

FIGS. 6A-6B illustrate another example Li doping fabrication method for constructing a Li-ion battery. The method may comprise, for example: providing active material particles to store and release ions during battery operation (block 602); electrically connecting the anode active particles with the anode current collector, and electrically connecting the cathode active particles with the cathode current collector (for connecting the active particle together during the electrode fabrication, this method may involve mixing the active particles with a binder) (block 604); providing an electrolyte comprising a sacrificial salt (block 606); pre-assembling a stack of anode/separator/cathode layers, where one type of the electrodes is physically separated (e.g., at a distance within the 0.1-10 mm range) from the separator layer (block 608); immersing the stack into electrolyte comprising sacrificial Li ion salts (in some designs, such an electrolyte may be flowing between the stack layers) (block 610); applying the potential to the electrodes in order to induce decomposition of the sacrificial salts and release Li ions to one of the electrodes (e.g., the anode) (in some configurations the gaseous products released during the doping process may be simultaneously evacuated) (block 612); and inserting the stack into the cell housing (e.g., into a pouch cell or prismatic cell housing), extracting excess of electrolyte and sealing the sell (block 616). In some designs, prior to sealing, the method may (optionally) involve at least partial replacement of the electrolyte used for the "Li doping" of the anode with another electrolyte that provides more favorable performance in certain applications of the produced high energy density Li ion battery (optional block 614).

Figure 7A:
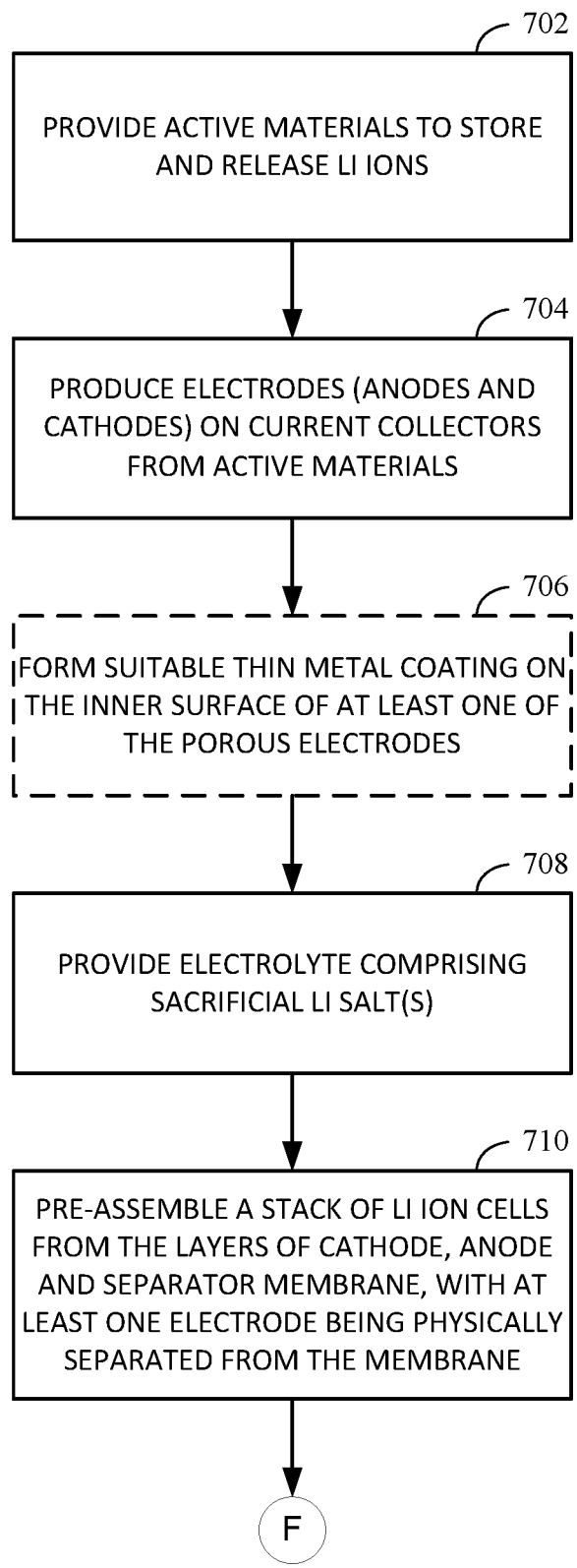
FIGS. 7A-7B illustrate another example Li doping fabrication method for constructing a Li-ion battery.
Figure 7B:
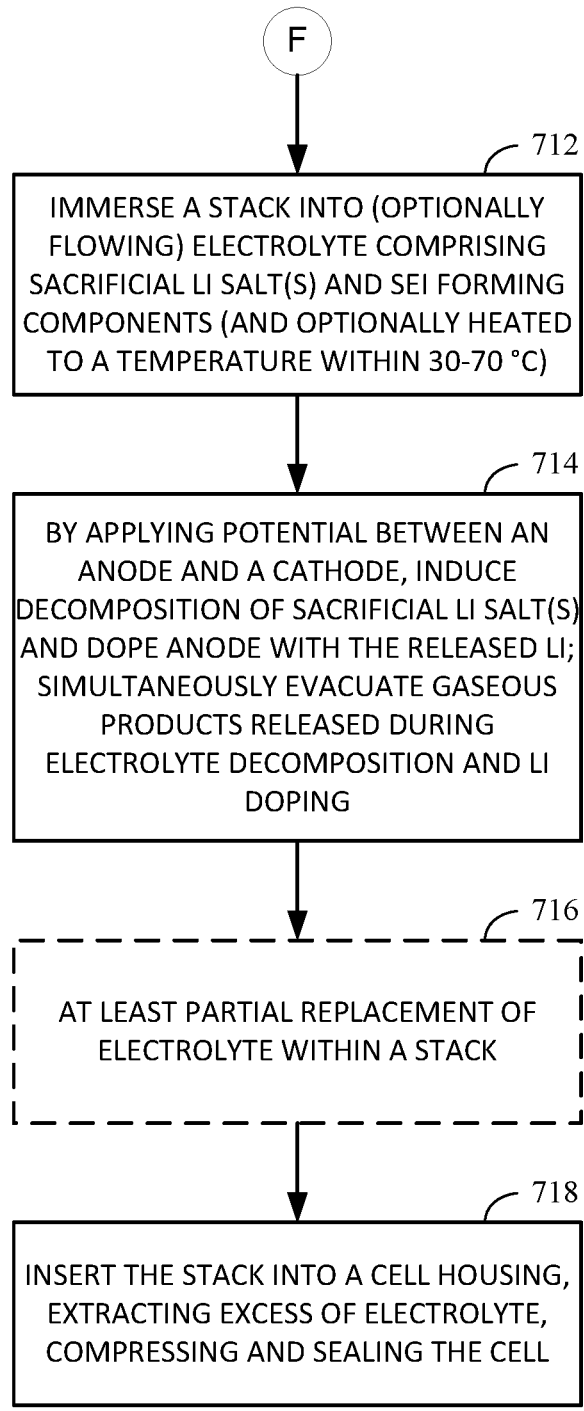

FIGS. 7A-7B illustrate another example Li doping fabrication method for constructing a Li-ion battery. The method may comprise, for example: providing active material particles to store and release ions during battery operation (block 702); electrically connecting the anode active particles with the anode current collector, and electrically connecting the cathode active particles with the cathode current collector (for connecting the active particles together during the electrode fabrication, this method may involve mixing the active particles with a binder) (block 704); optionally coating the surface of at least one of the electrodes with a suitable (e.g., metallic) layer that improves electrode stability or cell performance (optional block 706); providing an electrolyte comprising a sacrificial salt (block 708); pre-assembling a stack of anode/separator/cathode layers, where one type of the electrodes is physically separated (e.g., at a distance within the 0.5-20 mm range) from the separator layer (block 710); immersing the stack into electrolyte comprising sacrificial Li ion salts and SEI forming additives (in some designs, such an electrolyte may be flowing between the stack layers, and in some designs the electrolyte may be heated, e.g., to a temperature within the 40-65° C. range) (block 712); applying the potential to the electrodes in order to induce decomposition of the sacrificial salts and release Li ions to one of the electrodes (e.g., the anode) (in some designs, the gaseous products released during the doping process may be simultaneously evacuated) (block 714); and inserting the stack into the cell housing (e.g., into a pouch cell or prismatic cell housing), extracting excess of electrolyte, and sealing the cell (block 718). In some designs, prior to sealing, the method may (optionally) involve at least partial replacement of the electrolyte used for the "Li doping" of the anode with another electrolyte that provides more favorable performance in certain applications of the produced high energy density Li ion battery (optional block 716).

The forgoing description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

What is claimed is:

1. A Li-ion battery comprising:
   an anode electrically connected to an anode current collector;
   a cathode electrically connected to a cathode current collector;
   a separator interposed between the anode and the cathode; and
   an electrolyte ionically coupling the anode and the cathode,
   wherein an anode composition of the anode comprises silicon (Si),
   wherein an electrolyte composition of the electrolyte comprises $LiPF_6$ salt,
   wherein a cathode composition of the cathode comprises (i) active Li-comprising cathode material selected from lithium cobalt oxide, lithium nickel cobalt aluminum oxide (NCA), lithium nickel cobalt manganese oxide (NCM), or a lithium metal oxy-fluoride and (ii) a high capacity Li-comprising cathode additive, and
   wherein the high capacity Li-comprising cathode additive exhibits at least about 10% higher volumetric capacity than the active Li-comprising cathode material,
   wherein the high capacity Li-comprising cathode additive is in direct contact with an electrically conductive material, and
   wherein the electrically conductive material is arranged as a shell layer or a coating of the high capacity Li-comprising cathode additive.

2. The Li-ion battery of claim 1, wherein the anode composition further comprises graphite.

3. The Li-ion battery of claim 1, wherein the anode composition exhibits first cycle losses in a range from about 4% to about 45%.

4. The Li-ion battery of claim 3, wherein the first cycle losses are in a range from about 4% to about 20%.

5. The Li-ion battery of claim 4, wherein the first cycle losses are in a range from about 4% to about 15%.

6. The Li-ion battery of claim 1, wherein the electrolyte composition further comprises one or more carbonate solvents.

7. The Li-ion battery of claim 6, wherein the one or more carbonate solvents comprise fluoroethylene carbonate (FEC).

8. The Li-ion battery of claim 6, wherein the one or more carbonate solvents comprise vinylene carbonate (VC) or vinyl ethylene carbonate (VEC).

9. The Li-ion battery of claim 1, wherein the electrolyte composition further comprises one or more esters.

10. The Li-ion battery of claim 1, wherein the electrolyte composition further comprises one or more nitriles.

11. The Li-ion battery of claim 1, wherein the electrolyte composition further comprises one or more sulfites.

12. The Li-ion battery of claim 11, wherein the one or more sulfites comprise fluoroethylene sulfite.

13. The Li-ion battery of claim 1, wherein the electrolyte composition further comprises a $LiC_2NO_4F_6S_2$.

14. The Li-ion battery of claim 1, wherein the high capacity Li-comprising cathode additive is uniformly distributed within the cathode.

15. The Li-ion battery of claim 1, wherein the high capacity Li-comprising cathode additive is located at least in a surface layer of the cathode.

16. The Li-ion battery of claim 1, wherein at least some of the high capacity Li-comprising cathode additive is comprised in an interlayer between a cathode current collector foil and the cathode.

17. The Li-ion battery of claim 1, wherein the electrically conductive material comprises carbon.

18. The Li-ion battery of claim 1, wherein the high capacity Li-comprising cathode additive comprises a metal oxide.

19. The Li-ion battery of claim 18, wherein the metal oxide comprises vanadium.

20. The Li-ion battery of claim 19, wherein the metal oxide comprises a lithium vanadium oxide.

21. The Li-ion battery of claim 20, wherein the lithium vanadium oxide is $Li_2V_2O_5$ or $Li_3V_2O_5$.

22. The Li-ion battery of claim 18, wherein the metal oxide comprises $Li_2O$.

23. The Li-ion battery of claim 22, wherein the $Li_2O$ is in direct contact with a catalyst material particle that decreases Li extraction potential of the $Li_2O$.

24. The Li-ion battery of claim 18, wherein the metal oxide comprises iron.

25. The Li-ion battery of claim 24, wherein at least some of the iron is present in a 3+ oxidation state.

26. The Li-ion battery of claim 24, wherein the metal oxide is a lithium iron oxide.

27. The Li-ion battery of claim 18, wherein the metal oxide is a reaction product of $Li_2O$ and an amphoteric compound.

28. The Li-ion battery of claim 27, wherein the amphoteric compound is another metal oxide.

29. The Li-ion battery of claim 1, wherein the high capacity Li-comprising cathode additive comprises a Li salt of an organic acid.

30. The Li-ion battery of claim 29, wherein the organic acid comprises more than one carboxylic group.

31. The Li-ion battery of claim 30, wherein the organic acid comprises oxalic acid or citric acid.

* * * * *